(12) United States Patent
Lee et al.

(10) Patent No.: US 11,930,542 B2
(45) Date of Patent: Mar. 12, 2024

(54) SOURCE DEVICE SWITCHING METHOD AND DEVICE THROUGH BLUETOOTH CONNECTION INFORMATION SHARING

(71) Applicant: Samsung Electronics Co., Ltd., Gyeonggi-do (KR)

(72) Inventors: Jubyung Lee, Gyeonggi-do (KR); Hyeonjin Kang, Gyeonggi-do (KR); Inshik Shin, Gyeonggi-do (KR); Kyusang Ryu, Gyeonggi-do (KR); Hyungseoung Yoo, Gyeonggi-do (KR); Wonjun Jang, Gyeonggi-do (KR); Bokun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 17/694,928

(22) Filed: Mar. 15, 2022

(65) Prior Publication Data

US 2022/0201775 A1     Jun. 23, 2022

Related U.S. Application Data

(63) Continuation of application No. PCT/KR2020/012090, filed on Sep. 8, 2020.

(30) Foreign Application Priority Data

Oct. 31, 2019 (KR) .................. 10-2019-0137854

(51) Int. Cl.
*H04W 76/10* (2018.01)
*H04W 4/80* (2018.01)
*H04W 76/38* (2018.01)

(52) U.S. Cl.
CPC ............. *H04W 76/10* (2018.02); *H04W 4/80* (2018.02); *H04W 76/38* (2018.02)

(58) Field of Classification Search
CPC ....... H04W 4/80; H04W 76/10; H04W 8/005; H04W 76/38; H04W 76/40; H04W 48/18; H04W 48/10
See application file for complete search history.

(56) References Cited

U.S. PATENT DOCUMENTS

| 9,008,917 B2 | 4/2015 | Gautama et al. |
| 2007/0173270 A1 | 7/2007 | Block et al. |

(Continued)

FOREIGN PATENT DOCUMENTS

| KR | 10-2013-0077192 A | 7/2013 |
| KR | 10-2015-0026775 A | 3/2015 |

(Continued)

OTHER PUBLICATIONS

Extended European Search Report dated Oct. 7, 2022.

*Primary Examiner* — Tuan H Nguyen
(74) *Attorney, Agent, or Firm* — Cha & Reiter, LLC

(57) ABSTRACT

A method and a device is provided for switching a source device through sharing of Bluetooth connection information, the device comprising a communication module, a memory, and a processor operatively connected to the communication module or the memory, wherein the processor is configured to connect with an external device via the communication module through a first network, broadcast device information of the external device through a second network, transmit connection information associated with the first external device to an external electronic device responsive to a connection request received from the external device for a connection with the first external device through the second network, release a connection between the first network and the first external device, without processing a reconnection message received from the external device.

9 Claims, 12 Drawing Sheets

(56) References Cited

U.S. PATENT DOCUMENTS

| | | | |
|---|---|---|---|
| 2013/0010728 A1* | 1/2013 | Oguchi | H04W 60/00 |
| | | | 370/329 |
| 2014/0188348 A1 | 7/2014 | Gautama et al. | |
| 2015/0065053 A1 | 3/2015 | Cho et al. | |
| 2015/0244853 A1 | 8/2015 | Shin et al. | |
| 2016/0105924 A1* | 4/2016 | Baek | H04W 76/10 |
| | | | 455/41.2 |
| 2016/0227381 A1 | 8/2016 | Bargetzi et al. | |
| 2017/0286027 A1 | 10/2017 | Chang et al. | |
| 2019/0200414 A1 | 6/2019 | Abraham et al. | |

FOREIGN PATENT DOCUMENTS

| | | |
|---|---|---|
| KR | 10-2015-0099673 A | 9/2015 |
| KR | 10-2016-0042569 A | 4/2016 |

\* cited by examiner

FIG. 2
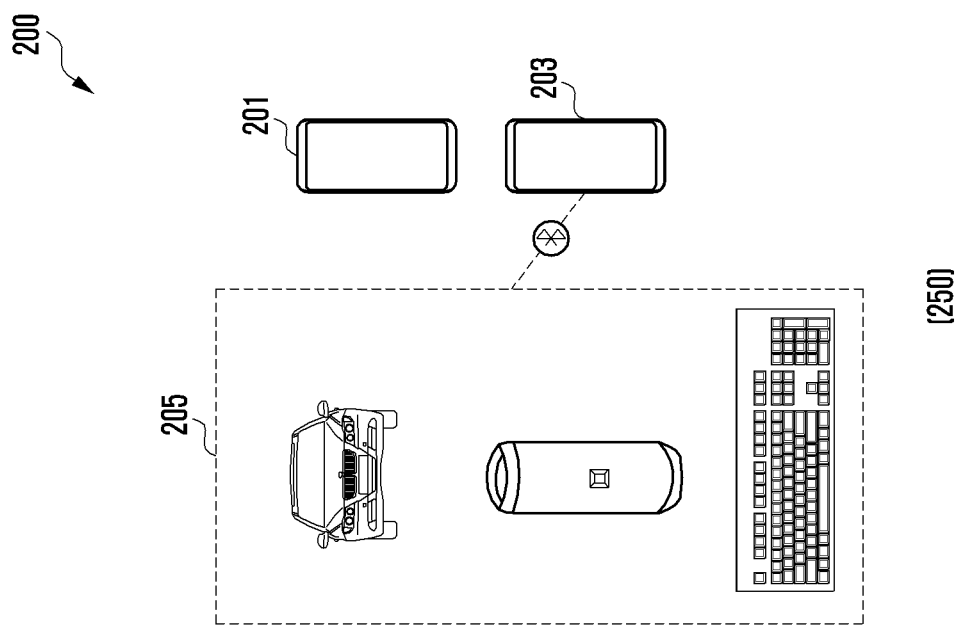
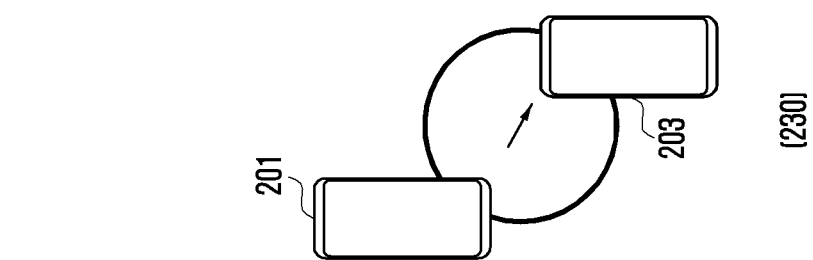
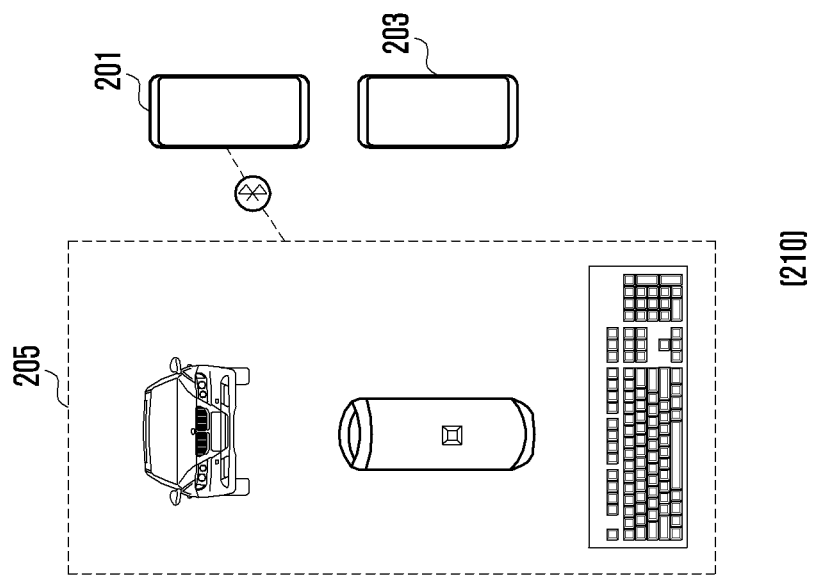

FIG. 6B

| Step | Message | Packet Type | Direction | Hopping Sequence | Access Code and Clock |
|---|---|---|---|---|---|
| 1 | Page | ID | Master to slave | Page | Slave |
| 2 | First slave page response | ID | Slave to master | Page response | Slave |
| 3 | Master page response | FHS | Master to slave | Page | Slave |
| 4 | Second slave page response | ID | Slave to master | page response | Slave |
| 5 | 1st packet master | POLL | Master to slave | Channel | Master |
| 6 | 1st packet slave | Any type | slave to master | Channel | Master |

| Command | OCF | Command Parameters | Return Parameters |
|---|---|---|---|
| HCI_Write_Scan_Enable | 0x011A | Scan_Enable | Status |

[650]

651

| Value | Parameter Description |
|---|---|
| 0x00 | No Scans enabled. Default |
| 0x01 | Inquiry Scan enabled. Page Scan disabled. |
| 0x02 | Inquiry Scan disabled. Page Scan enabled. |
| 0x03 | Inquiry Scan enabled. Page Scan enabled. |
| All other Values | Reserved for future use |

[670]

671
673

SOURCE DEVICE SWITCHING METHOD AND DEVICE THROUGH BLUETOOTH CONNECTION INFORMATION SHARING

CROSS-REFERENCE TO RELATED APPLICATION(S)

This application is a continuation of International Application No. PCT/KR2020/012090, filed on Sep. 8, 2020, which claims priority to Korean Patent Application No. 10-2019-0137854, filed on Oct. 31, 2019 in the Korean Intellectual Property Office, the disclosures of which are herein incorporated by reference.

BACKGROUND

1. Field

Certain embodiments of the disclosure relate to a method and an apparatus for switching a source device through sharing of Bluetooth connection information.

2. Description of Related Art

An electronic device (e.g., a mobile phone) may be connected to an external device, an external output device, such as a notebook, earphones, or headphones through a short-range wireless technology such as Bluetooth so as to exchange information there-between. For example, a user in a car may pair his/her personal electronic device with an audio system of the car through Bluetooth, thus allowing the user to reproduce music or make a phone call from the personal electronic device through the audio system paired with the user's personal electronic device, even while driving.

The connection between Bluetooth devices is facilitated by sets of rules called profiles that define the allowed functions for the connected devices. In other words, a Bluetooth profile may be a protocol added to the Bluetooth standard in order to clearly define which type of data is transmitted by a Bluetooth device. Currently there are about 27 Bluetooth profiles, however, only a small subset are used with regularity. For example, the Bluetooth profiles currently in use include a headset profile (HSP), a hands-free profile (HFP), and an advanced audio distribution profile (A2DP). The HSP profile allows for calls to be answered, ended and the volume level adjusted from a headset. This profile may be used for Bluetooth earphones and for a hands-free audio system of a vehicle. The hands-free profile (HFP) profile facilitates placing calls from a Bluetooth device. It is a critical part of car infotainment systems that support wireless phone calls. This profile supports a general phone interaction (e.g., reception, rejection, or termination of a call) on the basis of the HSP. The A2DP profile is a profile for transmitting audio data between Bluetooth devices. In particular, it defines how multimedia audio can be streamed from one device to another over a Bluetooth connection, sometimes referred to as Bluetooth Audio Streaming. e.g., music can be streamed from a mobile phone to a wireless headset or car audio or from a laptop/desktop to a wireless headset. The hands-free profile (HFP) and the headset profile (HSP) may bi-directionally transmit audio data but the audio distribution profile (A2DP) may only uni-directionally transmit high-quality audio data.

An external device (e.g., a speaker) may be temporarily shared with a second electronic device while the external device is paired with a first electronic device. However, in order to connect (e.g., pair) the external device to the second electronic device, while it is paired with the first electronic device, the conventional protocol requires that the pairing with the first electronic device should first be released, followed by performing a mutual discovery process and a mutual key authentication procedure between the external device and the second electronic device. Performing the steps of mutual discovery and mutual key authentication inconveniences the user. For example, a vehicle audio system provides a Bluetooth function in the form of a car kit. The car kit is used as a device for the connection (e.g., pairing) with a first electronic device of a driver and does not allow for the connection of a second electronic device of a passenger. In other words, the car kit does not allow the simultaneous connection of more than one electronic device at a time. Thus, the second electronic device of the passenger may not be simultaneously connected to the car kit while the first electronic device of the driver is connected to the car kit. In order to connect the second electronic device of the passenger to the car kit, the connection between the first electronic device of the driver and the car kit should first be released followed by performing a procedure of newly registering the second electronic device in the car kit. A new registration procedure may need a mutual discovery process and a mutual key authentication procedure between the car kit and the second electronic device, thus inconveniencing the user. Further, for the safety of the user, the car kit does not allow a request to be made for connecting the electronic device in the first instance while the vehicle is moving.

SUMMARY

Certain embodiments of the disclosure provide a method and an apparatus for using a plurality of electronic devices as audio sources through one external device (for example, speaker).

An electronic device according to certain embodiments comprises: a communication module, a memory, and a processor operatively connected to the communication module or the memory, wherein the processor is configured to connect with an external device via the communication module through a first network, connect with broadcast device information of the external device through a second network, transmit connection information related to the external device to an external electronic device transmitting a request for a connection with the external device through the second network, release the first network connection with the external device, and not process a reconnection message from the external device.

An electronic device according to certain embodiments includes a communication module, a memory, and a processor operatively connected to the communication module or the memory, wherein the processor is configured to receive information on an external device from an external electronic device connected to an external device through a first network, via the communication module through a second network, transmit a request for using the external device to the external electronic device through the second network, receive connection information related to the external device from the external electronic device through the second network in response to the request, and be connected to the external device through the first network, based on the received connection information.

In accordance with an aspect of the disclosure, second electronic device with an external electronic device, connected to a first electronic device, on the basis of connection information of the first electronic device and a link key can be disclosed.

According to various embodiments, the second electronic device different from the first electronic device can be rapidly connected to an external electronic device connected with the first electronic device through a Bluetooth protocol without any complex authentication procedure.

In accordance with a further aspect of the disclosure, user inconvenience is minimized or reduced due to a configuration of a pairing mode with the external electronic device required when the second electronic device is newly connected with the external electronic device. In accordance with a still further aspect of the disclosure, the second electronic device is capable of using all external electronic devices without consideration of manufacturer limitations of operational limitations of the external electronic devices. In this regard, usability with various manufacturer's external electronic devices is improved.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 2 illustrates a network environment between a plurality of electronic devices and an external device according to certain embodiments of the disclosure.

FIGS. 6A to 6C illustrate an example in which a first electronic device limits a scan state according to certain embodiments of the disclosure.

DETAILED DESCRIPTION

Figure 1:
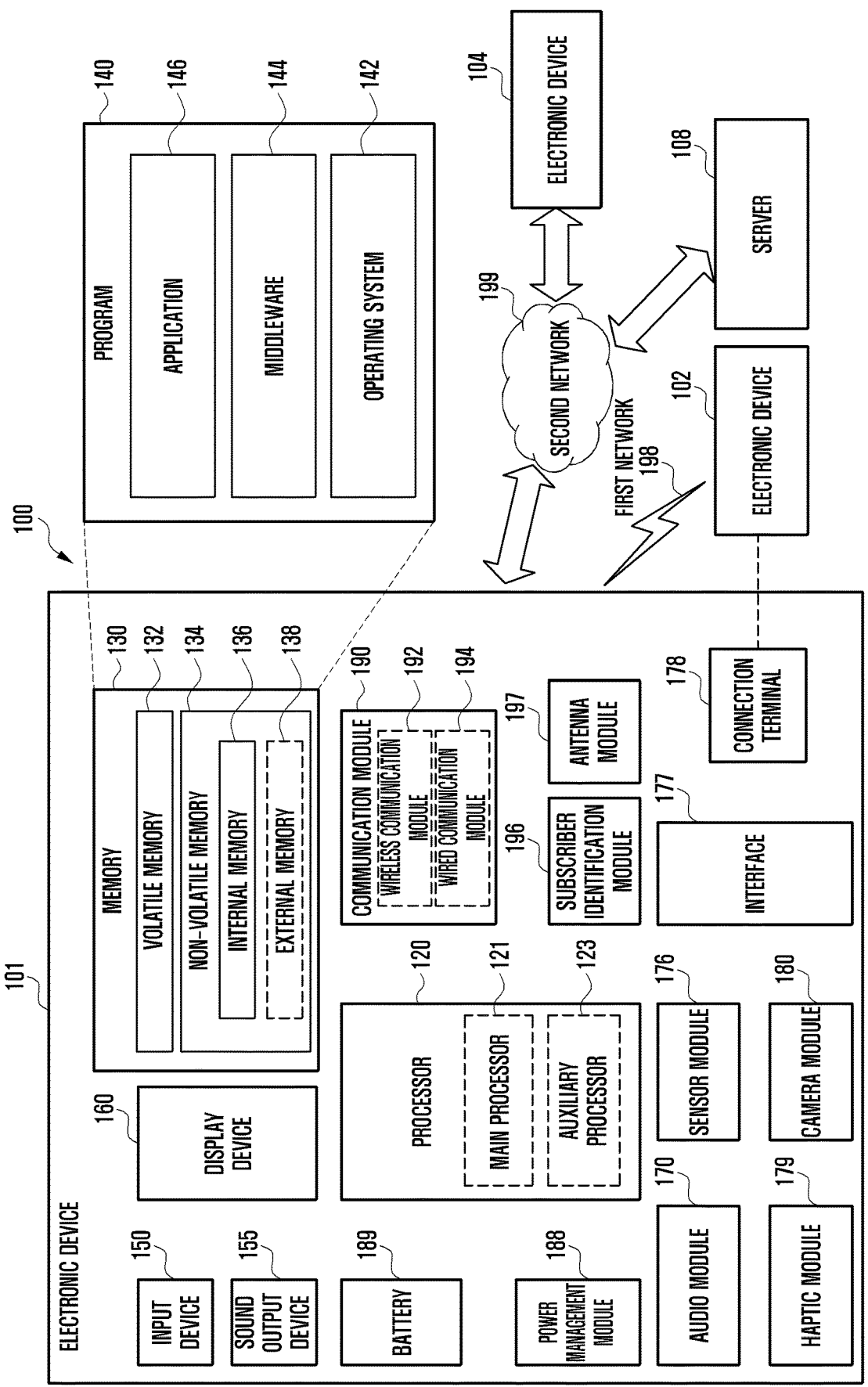
FIG. 1 is a block diagram illustrating an electronic device within a network environment according to certain embodiments of the disclosure.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combinations thereof and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., a speaker or headphones) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one antenna including a conductor formed on a substrate (e.g., a PCB) or a radiator formed of a conductive pattern. According to an embodiment, the antenna module 197 may include a plurality of antennas. In this case, at least one antenna appropriate for a communication scheme used in a communication network such as the first network 198 or the second network 199, for example, by the communication module 190 can be selected from the plurality of antennas. A signal or power may be transmitted or received between the communication module 190 and an external electronic device through the selected at least one antenna. According to some embodiments, other components (e.g., RFIC) other than the radiator may be additionally formed as a part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 2 illustrates an exemplary network environment 200 between a plurality of electronic devices 201, 203 and a single external device according to certain embodiments.

Referring to FIG. 2, there is shown a first network environment 210, a second network environment 230 and a third network environment 250. In the first network environment 210, there is shown a first electronic device 201 (e.g., the electronic device 101 of FIG. 1), a second electronic device 203 and an external device 205. The external device 205, can be by way of example, an external output device such as a car kit, a speaker or a keyboard. The first electronic device 201 may be connected (paired) with the external device 205. The pairing can be, for example, a process for generating link keys required for an authentication procedure between the first electronic device 201 and the external device 205 and wherein the generated link keys therebetween is completed. The external device 205 can be connected to the first electronic device 201 through Bluetooth and may exchange information with the first electronic device 201. For example, the external electronic device 205 may be a device for outputting information (e.g., data, audio) received from the first electronic device 201. FIG. 2 illustrates that the external device 205 is a car kit of a vehicle, a speaker, or a keyboard for understanding of the disclosure, but the disclosure is not limited thereby.

According to certain embodiments, the first electronic device 201 may be connected to the external device 205 through the first network 210. The first network 210 may correspond to the first network 198 of FIG. 1, and may be, for example, a Bluetooth network. In certain embodiments, the Bluetooth network may be a legacy Bluetooth network or Bluetooth basic rate/enhanced data rate (BR/EDR) network. The first electronic device 201 may broadcast device information of the external device 205 while the external device 205 is connected (e.g. paired) with the first electronic device 201. The device information of the external device 205 may include at least one of a name, an identifier, or a supported profile service related to the external device 205. The first electronic device 201 may inform at least one other external electronic device in the network located around the first electronic device 201, (e.g. a local device registered in the same cluster), that there is an available device which can be connected as a external device 205. The at least one other external electronic device may be a device saved in contacts stored in a memory (e.g. the memory 130 of FIG. 1) of the first electronic device 201. Hereinafter, the at least one other external electronic device will be referred to herein as a "second electronic device 203".

According to certain embodiments, in the first network environment 210, the first electronic device 201 may broadcast device information of the external device 205 through a second network 230. The second network 230 may correspond to one of the first network 198 or the second network 199 of FIG. 1. According to an embodiment, the second network 230 used for transmitting the device information may be different from the first network 210 used for the connection with the external device 205. For example, the second network 230 may be implemented as any one of a variety of types of known networks (e.g., Bluetooth low energy, WiFi direct, WiFi aware, or cellular network). Notably, none of the afore-mentioned networks may be used as the first network 210. The second electronic device 203 may receive device information of the external device 205 from the first electronic device 201. The second electronic device 203 may make a request to the first electronic device 201 for a connection with the external device 205 upon receiving a connection request from a user of the second electronic device 203. For example, the second electronic device 203 may display the received device information of the external device 205 on a display (e.g., the display device 160 of FIG. 1) and receive a connection request from the user of the second electronic device 203.

According to certain embodiments, in a second network environment 230, the first electronic device 201 may receive the connection request from electronic device 203 and transmit connection information for making the connection between the second electronic device 203 and the external device 205 to the second electronic device 203. The connection information may include Bluetooth address information and a link key of the first electronic device 201. The Bluetooth address information may be unique information used when the first electronic device 201 was previously connected (or paired) with the external device 205. The link key may be used for an authentication when a profile service between the electronic device 101 and the external device 205 is connected. The first electronic device 201 may transmit the connection information to the second electronic device 203 through a secure channel (e.g., WiFi aware). The second electronic device 203 may receive the connection information and store the same in a memory (e.g., the memory 130 of FIG. 1). Transmission of the connection information by the first electronic device 201 may mean that a right to use the external device 205 is assigned to the second electronic device 203. Alternatively, the second electronic device 203 may receive connection information for the connection with the external device 205 (e.g., Bluetooth address information and the link key of the first electronic device 201) from a server (e.g., the server 108 of FIG. 1).

According to certain embodiments, in a third network environment 250, the first electronic device 201 may release the connection with the external device 205. The first electronic device 201 may induce the release of the link (or the release of the connection) to the external device 205 in order to connect the second electronic device 203 to the external device 205. The first electronic device 201 (e.g., a link manager protocol (LMP)) may change a configuration value (e.g., supervision timeout) for releasing the connection with the external device 205. Hereinafter, to facilitate a clearer understanding of the disclosure, the configuration value for releasing the connection may be referred to herein as a 'disconnection notification timer'. E.g., in the Bluetooth standard, when there is no response between two devices connected through Bluetooth for a predetermined time, the connection is deemed to be disconnected (e.g. timed-out) according to a time-out value configured in "supervision timeout" and the link between the two devices may be automatically released.

In the Bluetooth standard, supervision timeout may be determined to be within a range from 0.625 ms to 40.9 s. The first electronic device 201 may configure the disconnection notification timer to a lower value (e.g., time increment) be in order to induce the release of the connection with the external device 205. For example, when the disconnection notification timer associated with the external device 205 is initially configured as '2 seconds', the first electronic device 201 may change the disconnection notification timer into the lowest time increment allowed, namely, (e.g. e.g., 0.625 ms, within a pre-defined allowable time range (e.g., 0.625 ms to 40.9 s) that can be configured as the disconnection notification timer. As a further example, the first electronic device 201 may change the disconnection notification timer (e.g. '2 seconds') into a multiple of 0.625 ms. For example, e.g. 0.625 ms*N, where N is a positive integer) such that 0.625 ms*N falls within the allowable time range boundaries (e.g., 0.625 ms to 40.9 s). The first electronic device 201 may change the disconnection notification timer and configure the changed disconnection notification timer.

When the disconnection notification timer is configured to be reduced from 2 seconds to 0.625 ms, the external device 205 may attempt a signal exchange with the first electronic device 201 at a time corresponding to 0.625 ms rather than 2 seconds, resulting in the external device 205 more rapidly recognizing the release of the connection with the first electronic device 201. For example, the external device 205 may maintain the connection when the signal exchange with the first electronic device 201 is normally performed at every 0.625 ms and may determine that the connection with the first electronic device 210 is released (e.g., link loss) when the signal exchange is not normally performed. After releasing the connection with the first electronic device 201, the external device 205 may insert Bluetooth address information of the first electronic device 201 into an access code and broadcast a page message. After releasing the connection with the external device 205, the first electronic device 201 may switch a Bluetooth controller (e.g., a first Bluetooth controller) to a page scan state in which the page message broadcasted from the external device 205 can be received. According to an embodiment, the first electronic device 201 may configure a message (e.g., a packet) received from the external device 205 not to be processed. e.g., the first electronic device 201 may control the first Bluetooth controller to not process the message received from the external device 205 through a vendor-specific command.

According to certain embodiments, when the connection with the external device 205 is released in the third network environment 250, the first electronic device 201 may inform the second electronic device 203 of the release of the connection with the external device 205 through the second network. The second electronic device 203 may receive completion of the release of the connection between the first electronic device 201 and the external device 205 from the first electronic device 201. Upon receiving notification of the completion of the release of the connection, the second electronic device 203 may generate a virtual Bluetooth controller for the connection with the external device 205. The second electronic device 203 may attempt the connection with the external device 205 on the basis of the connection information provided by the virtual Bluetooth controller. For example, the second electronic device 203 may switch the virtual Bluetooth controller to a page scan state and receive a page message transmitted from the external device 205 by the page scan state.

According to an embodiment, the second electronic device 203 may transfer a response message of the page message received by the virtual Bluetooth controller to the external device 205. The external device 205 may continuously transmit the page message after the release of the connection with the first electronic device 201. The second electronic device 203 may receive the page message from the external device 205 and transmit a response message of the received page message to the external device 205. The second electronic device 203 may decrypt an encrypted packet received from the external device 205 through the link key and may be connected to the external device 205 on the basis of Bluetooth address information of the first electronic device 201 by the virtual Bluetooth controller. Since the second electronic device 203 is connected to the external device 205 on the basis of the Bluetooth address information of the first electronic device 201, the external device 205 may recognize the second electronic device 203 as the first electronic device 201. Advantageously, the second electronic device 203 may be rapidly connected to the external device 205 on the basis of the connection information without a need to perform a conventional discovery process and a conventional mutual key authentication procedure with the external device 205.

An electronic device (e.g., the electronic device 101 of FIG. 1 or the first electronic device 201 of FIG. 2) according to certain embodiments may include a communication module (e.g., the communication module 190 of FIG. 1), a memory (e.g., the memory 130 of FIG. 1), and a processor (e.g., the processor 120 of FIG. 1) operatively connected to the communication module or the memory, and the processor may be configured to be connected to an external device (e.g., the external device 205 of FIG. 2) via the communication module through a first network 210, broadcast device information of the external device through a second network 230, transmit connection information related to the external device to an external electronic device transmitting a request for a connection with the external device through the second network 230, release the first network connection with the external device, and not process a reconnection message from the external device.

According to an embodiment, the processor may be configured to change a configuration value for release of the connection with the external device and release the connection with the external device, based on the changed configuration value.

According to an embodiment, the first network 210 may be Bluetooth, and the second network 230 may be configured to use one of various types of networks other than Bluetooth.

According to an embodiment, the processor may be configured to transmit the connection information to the external electronic device through a secure channel.

According to an embodiment, the processor may be configured to change a disconnection notification timer to a configuration value for release of the connection and configure the changed disconnection notification timer with the external device.

According to an embodiment, the processor may be configured to change the disconnection notification timer to be shortened so as to induce a release of a link with the external device.

According to an embodiment, the processor may be configured to make a request for changing a role with the external device and change the disconnection notification timer according to the external device accepting its changed role.

According to an embodiment, the processor may be configured to change a Bluetooth controller to not process a message received from the external device through a vendor-specific command after the connection with the external device is released.

According to an embodiment, the processor may be configured to receive a message from the external device and transmit completion of the release of the connection with the external device to the external electronic device while not processing the message.

According to an embodiment, the connection information may include Bluetooth address information of the electronic device and a link key.

According to an embodiment, the processor may be configured to display an external electronic device transmitting a request for the connection with the external device, based on contacts stored in the memory.

According to an embodiment, when a right to use the external device is returned from the external electronic device, the processor may be configured to change a Bluetooth controller to process a message received from the external device through a vendor-specific command.

According to an embodiment, an electronic device (e.g., the electronic device 101 of FIG. 1 or the second electronic device 203 of FIG. 2) according to certain embodiments may include a communication module 190 (a memory 130 (and a processor 120 operatively connected to the communication module or the memory, and the processor may be configured to receive information on an external device from an external electronic device connected to an external device 205 through a first network, via the communication module through a second network, transmit a request for using the external device 205 to the external electronic device through the second network, receive connection information related to the external device 205 from the external electronic device through the second network in response to the request, and be connected to external device 205 through the first network on the basis of the received connection information.

According to an embodiment, the processor of the electronic device may be configured to generate a virtual Bluetooth controller for a connection with the external device 205.

According to an embodiment, the processor of the electronic device may be configured to transmit the connection information to the virtual Bluetooth controller by using a vendor-specific command and be connected to the external device 205 on the basis of Bluetooth address information of the external electronic device included in the connection information by using the virtual Bluetooth controller.

According to an embodiment, when receiving a notification of completion of release of the connection with the external device 205 from the external electronic device, the processor may be configured to generate a virtual Bluetooth controller and attempt to be connected with the external device 205 on the basis of the received connection information by using the generated virtual Bluetooth controller.

According to an embodiment, the processor of the electronic device may be configured to generate a virtual Bluetooth controller for a connection with the external device 205, switch the virtual Bluetooth controller to a page scan state, and receive a page message transmitted from the external device 205 by the page scan state to be connected with the external device.

According to an embodiment, the processor of the electronic device may be configured to decrypt an encrypted packet received from the external device 205 by using a link key included in the connection information and be connected to the external device 205 by using the virtual Bluetooth controller based on Bluetooth address information of the external electronic device.

According to an embodiment, the processor of the electronic device may be configured to return a right to use the external device to the external electronic device in the state of the connection with the external device 205, change a disconnection notification timer with the external device 205, and induce release of the connection with the external device 205 on the basis of the changed disconnection notification timer.

According to an embodiment, when the connection with the external device 205 is released, the processor may be configured to remove the virtual Bluetooth controller for the connection with the external device 205.

Figure 3:
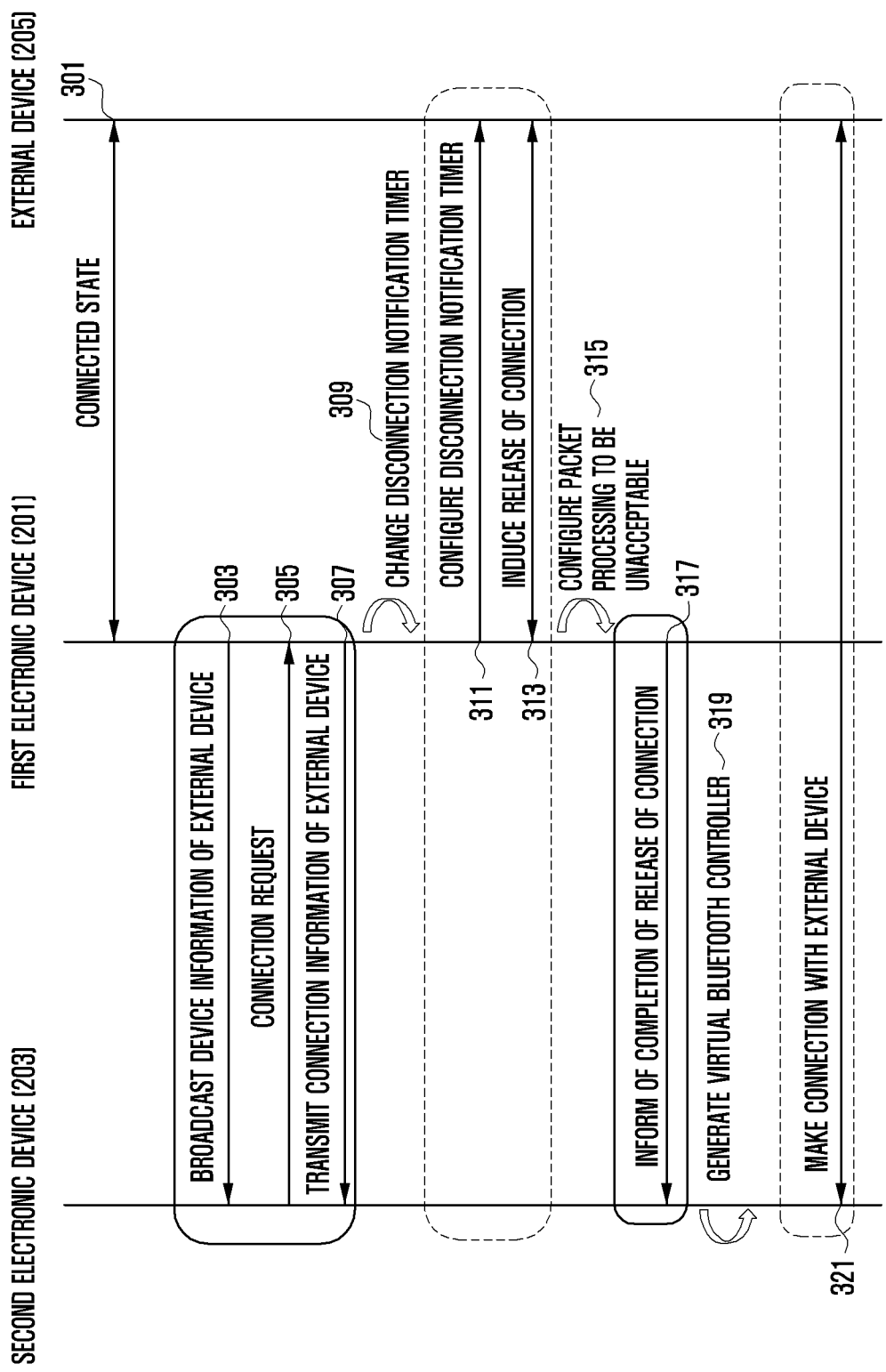
FIG. 3 is a flowchart illustrating an operation of connecting an external device, connected to a first electronic device, to a second electronic device according to certain embodiments of the disclosure.

FIG. 3 is a flowchart illustrating an operation of connecting an external device, connected to a first electronic device, to a second electronic device according to certain embodiments.

Referring to FIG. 3, in operation 301, a first electronic device 101, 201 may be connected (or paired) with the external device 205. The first electronic device 201 may include the same elements (as the electronic device 101 of FIG. 1. The pairing may be, for example, a state in which a process for generating link keys required for an authentication procedure between the first electronic device 201 and the external device 205 and exchanging the generated link keys therebetween is completed. The term "is paired" may mean that link keys required for an authentication have been already stored when a profile service between the first electronic device 201 and the external device 205 is connected in the future. The external device 205 may be, for example, a device capable of being connected to the first electronic device 201 through Bluetooth and exchanging information with the first electronic device 201. According to an embodiment, the first electronic device 201 may be connected to the external device 205 through the first network. The first network may correspond to one of the first networks of FIG. 1, and may be, for example, a Bluetooth network.

In operation 303, the first electronic device 201 may broadcast device information of the external device 205 while the external device 205 is connected thereto. The device information of the external device 205 may include at least one of a name related to the external device 205, an identifier, or a supported profile service. The first electronic device 201 may inform at least one other external electronic device, different from, (e.g., the electronic device 102 and the electronic device 104 of FIG. 1) located around the first electronic device that there is a device which can be connected as the external device 205. For example, the at least one other external electronic device (e.g. 102, 104) may be a device saved in contacts stored in a memory (e.g., the memory 130 of FIG. 1) of the first electronic device 201. Hereinafter, the at least one other external electronic device will be referred to as a second electronic device 203 to more clearly distinguish it from the first electronic device 201.

According to various embodiments, the first electronic device 201 may inform the second electronic device 203 registered in the same cluster as the first electronic device 201 that there is a device which can be connected as the external device 205. The first electronic device 201 may transmit device information to the second electronic device 203 through a second network. The second network may correspond to one of the first network 198 or the second network 199 of FIG. 1. The second network used for transmitting the device information may be different from the first network used for the connection with the external device 205. For example, the second network may use one of various types of networks (e.g., Bluetooth low energy, WiFi direct, WiFi aware, or cellular network) which are not used for the first network among the first network 198 or the second network 199.

According to various embodiments, the first electronic device 201 may recognize (or identify) the existence of the second electronic device 203 in various methods and transmit the device information to the recognized second electronic device 203. For example, the first electronic device 201 may receive a BLE advertising event transmitted from the second electronic device 203 and recognize the existence of the second electronic device 203. According to an embodiment, the first electronic device 201 may receive a packet (or a message) including Bluetooth address information of the second electronic device 203 from the second electronic device 203 through WiFi aware, interwork with a server (e.g., the server 108 of FIG. 1) to recognize the existence of the second electronic device 203 transmitting the packet, or recognize the existence of the second electronic device 203 through NFC tagging. The first electronic device 201 may recognize the second electronic device 203 located around the first electronic device on the basis of information on the strength of various network signals (received signal strength indication) detected during a process of searching for various networks.

In operation 305, the second electronic device 203 may make a request for the connection with the external device 205 to the first electronic device 201 on the basis of a user input. The second electronic device 203 may receive device information of the external device 205 from the first electronic device 201 and display the received device information of the external device 205 on a display (e.g., the display device 160 of FIG. 1). The second electronic device 203 may receive a user input for selecting the device information of the external device 205 from the user. The second electronic device 203 may make a request for the connection with the external device 205 to the first electronic device 201 on the basis of the received user input.

In operation 307, the first electronic device 201 may transmit connection information associated with the connection with the external device 205 to the second electronic device 203. Transmission of the connection information by the first electronic device 201 to the second electronic device 203 may mean that a right to use the external device 205 is assigned to the second electronic device 203. The first electronic device 201 may receive the connection request from the second electronic device 203 and transmit the connection information to the second electronic device 203 in response to the connection request. The connection information may include Bluetooth address information and a link key of the first electronic device 201. The Bluetooth address information may be unique information used when the first electronic device 201 is connected (or paired) with the external device 205. The link key may be information used for the authentication when a profile service between the electronic device 101 and the external device 205 is connected. The first electronic device 201 may transmit the connection information to the second electronic device 203 through a secure channel (e.g., a WiFi aware channel). The second electronic device 203 may receive the connection information and store the same in a memory (e.g., the memory 130 of FIG. 1).

In operation 309, the first electronic device 201 may change a disconnection notification timer with the external device 205. The first electronic device 201 may induce the release of the connection with the external device 205 in order to connect the second electronic device 203 with the external device 205. For example, in the Bluetooth standard, a signal may be exchanged between two devices connected through Bluetooth according to a value configured in "supervision timeout". In the Bluetooth standard, supervision timeout may be determined within a range from 0.625 milliseconds to 40.9 seconds.

For example, when the disconnection notification timer between the first electronic device 201 and the external device 205 is configured as '2 seconds', the first electronic device 201 and the external device 205 may exchange a signal every 2 seconds. When the disconnection notification timer is configured to be shorter than 2 seconds, the external device 205 may more rapidly recognize the release of the connection with the first electronic device 201. For example, the first electronic device 201 may change the disconnection notification timer configuration value to the smallest time increment allowable (e.g., 0.625 ms) within the specified time range (e.g., 0.625 ms to 40.9 s) that can be configured as the disconnection notification timer. In another example, the first electronic device 201 may change the disconnection notification timer to assume the value of a multiple "N" of 0.625 ms, the smallest increment. For example, the timer would assume a value of (0.625 ms*N), with N being a positive integer within the specified time range, namely, (e.g., 0.625 ms to 40.9 s) that can be configured as the disconnection notification timer.

According to certain embodiments, since a subject to configure the disconnection notification timer is referred to as a "master" in the Bluetooth standard, the first electronic device 201 may exchange the role of "master" with the external device 205 in order to change the disconnection notification timer. According to the Bluetooth standard, when the external device 205 is an output device (e.g., a speaker), the external device 205 may be configured as the master. The first electronic device 201 may transmit a message making a request for changing the role (e.g., slave→master) to the external device 205, and the external device 205 may receive a return message accepting the change in the role. After changing the role from slave to master upon acceptance of the role change, the first electronic device 201, now acting as master, may change the disconnection notification timer.

In operation 311, the first electronic device 201 may configure the disconnection notification timer with the external device 205 to the changed value. More particularly, when the disconnection notification timer is changed from 2 seconds to 0.625 ms, the external device 205 may attempt a signal exchange with the first electronic device 201 at the changed disconnection notification timer interval, namely, 0.625 ms. Changing the value from 2 seconds to 0.625 ms results in a more rapid recognition of release of the connection with the first electronic device 201.

In operation 313, the first electronic device 201 may induce the release of the connection, or the release of the link, with the external device 205. If there is no response during the changed disconnection notification timer, the first electronic device 201 and the external device 205 may consider that the connection is disconnected and may automatically release the link between the two devices. The first electronic device 201 may maintain the connection when the signal exchange is normally performed during the time corresponding to the changed disconnection notification timer with the external device 205 and may otherwise determine that the connection is released (e.g., link loss) when the signal exchange is not normally performed. That is, the external device 205 exchanges the signal with the first electronic device 201 at 0.625 ms (e.g., the changed disconnection notification timer), and the external device 205 may determine thereafter that the connection with the first electronic device 201 has been released when a response message to the signal is not received from the first electronic device 201.

In operation 315, the first electronic device 201 may change message the reception processing by the first Bluetooth controller to an "unacceptable" status. After releasing the connection with the first electronic device 201, the external device 205 may insert Bluetooth address information of the first electronic device 201 into an access code for the re-connection with the first electronic device 201 and broadcast a page message. After releasing the connection with the external device 205, the first electronic device 201 may configure the Bluetooth controller (e.g., the first Bluetooth controller) to not transmit a response message to the page message received from the external device 205.

For example, the first electronic device 201 may control the first Bluetooth controller to not process the message received from the external device 205 through a vendor-specific command. The vendor-specific command is a commmend from a Bluetooth host to a controller, which is not defined in the Bluetooth specification, and may be a command defined by a manufacturer that manufactures a corresponding chip. By changing the message reception processing to "unacceptable", the response message may be prevented from being transmitted or otherwise limiting the paging scan state.

For example, when it is determined by the first electronic device 201 that the connection with the external device 205 is released, the first electronic device 201 may switch to the page scan state to allow the page message to be received from the external device 205. The first electronic device 201 may also perform a control operation to not transmit a response message (e.g., a page response) to the page message received from a master device (e.g., the external device 205) in the page scan state e.g., the first electronic device 201 does not transmit a page response to the external device 205). Alternatively, the first electronic device 201 may limit the page scan state. Bluetooth host controller interface (HCI) commands may be identified by a 16-bit command code, and the vendor-specific command may be defined as a value within a range from 0x0000 to 0xFBFF according to the Bluetooth standard.

The first electronic device 201 may limit the page scan state by the first Bluetooth controller by using values in ranges from 0xFC00 to 0xFFFF, that is, 1024 commands as the vendor-specific commands. For example, when a value of 0x00 is transmitted through a command parameter using HCI_Write_Scan_Enable from among the HCI commands, the first electronic device 201 may configure the page scan state of the first Bluetooth controller as "no scans enabled". Since the external device 205 uses a Bluetooth address of the first electronic device 201 as an access code when the page message is transmitted, the page scan in the first electronic device 201 may not accept the re-connection from all external devices. The existing device connected to the first electronic device 201 is not influenced by the limitations imposed upon the page scan of the first electronic device 201, and thus may maintain the existing connection.

When the first electronic device 101 transmits a response message in response to the page message transmitted from the external device 205, the first electronic device 201 may be connected to the external device 205 again, and thus the first electronic device 201 may not transmit the response message to the external device 205 in order to connect the second electronic device 203 instead of the first electronic device 201 to the external device 205. According to certain embodiments, the first electronic device 201 may turn off a "Bluetooth function" of the first electronic device 201. When the Bluetooth function of the first electronic device 201 is turned off, the first electronic device 201 may become "no scans enabled".

In operation 317, the first electronic device 201 may inform the second electronic device 203 that the connection between the first electronic device 201 and the external device 205 is released (or the link therebetween is released) through the second network. The second electronic device 203 may receive completion of the release of the connection with the external device 205 from the first electronic device 201.

In operation 319, the second electronic device 203 may generate a virtual Bluetooth controller for the connection with the external device 205. The second electronic device 203 may include a a second Bluetooth controller) which can be connected to the external device through Bluetooth similar to the connection previously made with the first electronic device 201. The "second Bluetooth controller" is terminology used, by way of example only, for the purpose of distinguishing it from the "first Bluetooth controller" included in the first electronic device 201, and does not limit the disclosure. The second Bluetooth controller may be connected to the on the basis of Bluetooth address information of the second electronic device 203, and the virtual Bluetooth controller may be connected to the external device 205 on the basis of Bluetooth address information of the first electronic device 201.

According to various embodiments, the second electronic device 203 may transfer connection information to the virtual Bluetooth controller by using a vendor-specific command. The virtual Bluetooth controller may be connected to the external device 205 on the basis of the connection information. For example, the second electronic device 203 may switch the virtual Bluetooth controller to a page scan state and receive a page message transmitted from the external device 205 by the page scan state.

In operation 321, the second electronic device 203 may be connected to the external device 205 on the basis of the connection information. The second electronic device 203 may transmit a response message of the page message received by the virtual Bluetooth controller to the external device 205. Since the external device 205 is configured to continuously transmit the page message after the connection with the first electronic device 201 is released and the first electronic device 201 is configured to not transmit the response message of the page message, the second electronic device 203 may be connected to the external device 205 through the first network (e.g., Bluetooth) if the second electronic device 203 transmits the response message of the page message to the external device 205.

The second electronic device 203 may decrypt the encrypted packet received from the external device 205 by using the link key and may be connected to the external device 205 on the basis of Bluetooth address information of the first electronic device 201 by the virtual Bluetooth controller. Accordingly, the external device 205 may recognize the second electronic device 203 as the first electronic device 201. The second electronic device 203 may be rapidly connected to the external device 205 on the basis of the connection information without a need to perform a discovery process and a mutual key authentication procedure with the external device 205.

Figure 4:
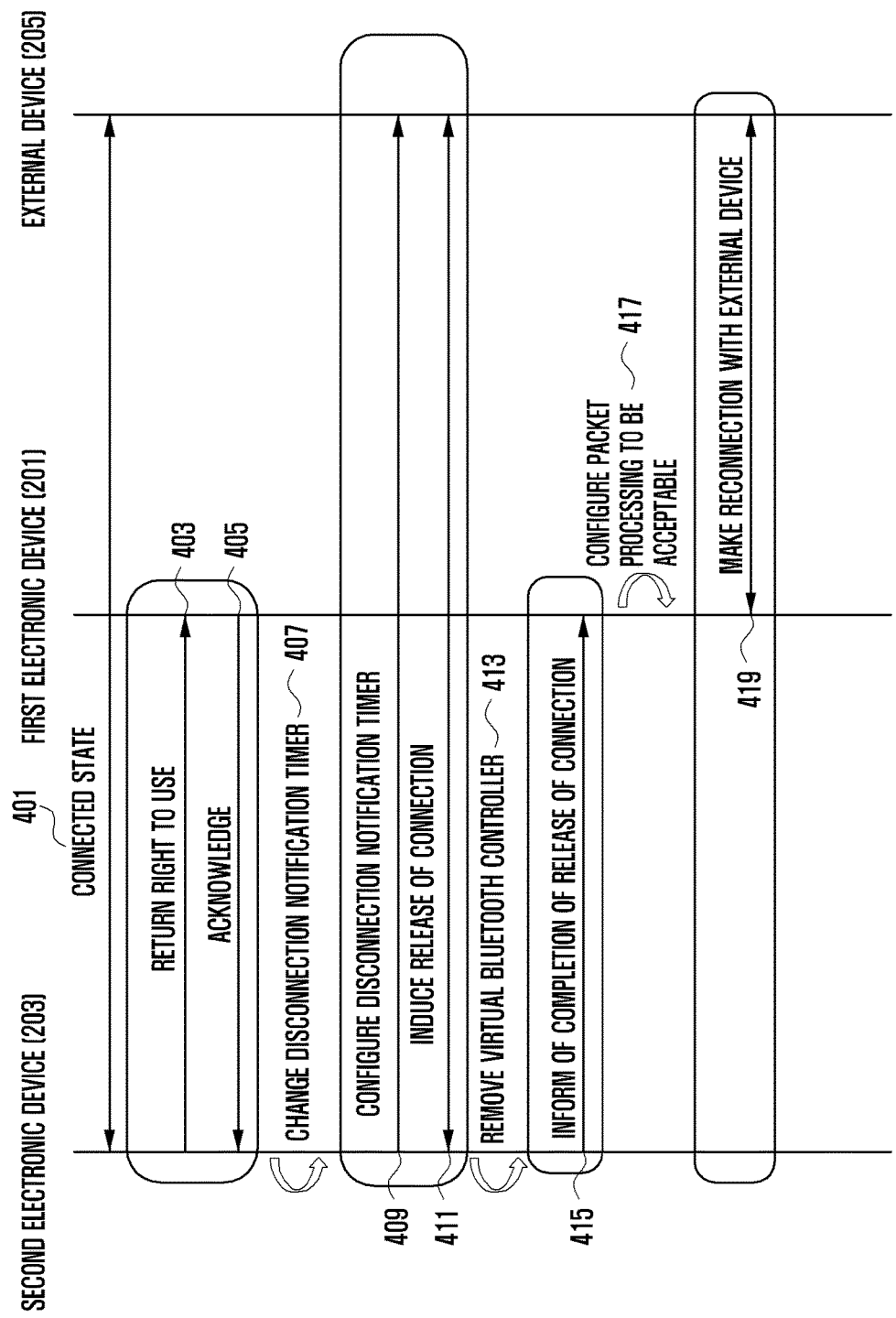
FIG. 4 is a flowchart illustrating an operation of reconnecting an external device, connected to a second electronic device, to a first electronic device according to certain embodiments of the disclosure.

FIG. 4 is a flowchart illustrating an operation of reconnecting an external device, connected to a second electronic device, to a first electronic device according to certain embodiments.

Referring to FIG. 4, in operation 401, a second electronic device (e.g., the electronic device 102 of FIG. 1 or the second electronic device 203 of FIG. 2) may be connected (or paired) with the external device 205. The second electronic device 203 may include the same elements (e.g., the processor 120 and the communication module 190) as the electronic device 101 of FIG. 1. The second electronic device 203 may be connected to the external device 205 through the first network. The first network may correspond to one of the first networks 198 of FIG. 1, and may be, e.g., "Bluetooth". Operation 401 may be the same as or similar to operation 301. Operation 301 may show the state in which the first electronic device 201 is connected to the external device 205, and operation 401 may show the state in which the second electronic device 203 is connected to the external device 205. Operation 401 is different from operation 301 in that the second electronic device 203 is connected to the external device 205 on the basis of Bluetooth address information of the first electronic device 201 rather than Bluetooth address information of the second electronic device. The second electronic device 203 may be connected to the external device 205 on the basis of Bluetooth address information of the first electronic device 201 by the virtual Bluetooth controller rather than the existing Bluetooth controller (e.g., the second Bluetooth controller).

In operation 403, the second electronic device 203 may return a right to use the external device 205 to the first electronic device 201. The right to use is a right to use the external device 205 and may be assigned to the second electronic device 203 by the operation of FIG. 3. The second electronic device 203 may release the connection with the external device 205 according a request from the user. The second electronic device 203 may control the first electronic device 201 to prepare the connection with the external device 205 by returning the right to use to the first electronic device 201 before the connection with the external device 205 is released.

In operation 405, the first electronic device 201 may receive the return of the right to use and transmit an acknowledgement signal of the return of the right to use. According to an embodiment, the first electronic device 201 may display a user interface for the return of the right to use on a display (e.g., the display device 160 of FIG. 1) and transmit the acknowledgement signal of the return of the right to use on the basis of a user input. According to an embodiment, when receiving the return of the right to use on the basis of a configuration of the first electronic device 201 or a configuration of the user, the first electronic device 201 may automatically transmit the acknowledgement signal. The first electronic device 201 may transmit the acknowledgement signal in the background without any identification by the user.

In operation 407, the second electronic device 203 may change a disconnection notification timer with the external device 205. The second electronic device 203 may release the connection with the external device 205 in order to allow the first electronic device 201 to be connected to the external device 205. For example, when the disconnection notification timer between the second electronic device 203 and the external device 205 is configured as '2 seconds', the second electronic device 203 and the external device 205 may exchange a signal in every 2 seconds. The second electronic device 203 may maintain the connection when the signal exchange with the external device 205 is normally performed within a time configured in the disconnection notification timer and may determine that the connection is released (e.g., link loss) when the signal exchange is not normally performed. According to various embodiments, since a subject to configure the disconnection notification timer is a "master" in the Bluetooth standard, the second electronic device 203 may exchange the role with the external device 205 in order to change the disconnection notification timer.

In operation 409, the second electronic device 203 may configure the changed disconnection notification timer as the disconnection notification timer with the external device 205. The second electronic device 203 may induce the external device 205 to release the connection with the second electronic device 203 by configuring the disconnection notification timer to be shorter than before. According to various embodiments, operation 409 may be the same as or similar to operation 311 of FIG. 3. Operation 409 has difference from operation 311 in that the subject to change the disconnection notification timer is the second electronic device 203 currently connected to the external device 205. Since the second electronic device 203 is connected to the external device 205 on the basis of Bluetooth address information of the first electronic device 201, operation 311 and operation 409 may be the same as each other in terms of the external device 205.

In operation 411, the second electronic device 203 may induce the release of the connection with the external device 205 (or the release of the link). If there is no response during the changed disconnection notification timer, the second electronic device 203 and the external device 205 may consider that the connection is disconnected and may automatically release the link between the two devices. When the signal exchange with the second electronic device 203 is not normally performed (or the release of the connection is recognized), the external device 205 may broadcast a page message for the connection (or reconnection) with the second electronic device 203. Although it is described that the external device 205 recognizes the release of the connection with the second electronic device 203 for understanding of the disclosure, the external device 205 recognizes the connection with the first electronic device 201 in operation 401 to operation 407, and thus it may be determined that the connection with the first electronic device 201 is released in terms of the external device 205.

In operation 413, the second electronic device 203 may delete (or remote) the virtual Bluetooth controller. The virtual Bluetooth controller is generated for the connection with the external device 205 on the basis of Bluetooth address information of the first electronic device 201, and is not needed when the connection with the external device 205 is released. Further, when the connection with the external device 205 is released, the external device 205 may transmit the page message for a reconnection. When the second electronic device 203 does not delete the virtual Bluetooth controller, the page message is received, and thus the second electronic device may be configured to not process the message received from the external device 205 by the virtual Bluetooth controller. The second electronic device 203 may delete the virtual Bluetooth controller by using the vendor-specific command.

In operation 415, the second electronic device 203 may inform the first electronic device 201 that the connection with the external device 205 is released through the second network. The first electronic device 201 may receive completion of the release of the connection with the external device 205 from the second electronic device 203.

In operation 417, the first electronic device 201 may change to accept reception of the message from the external device 205. The first electronic device 201 may change processing of reception of the message from the external device 205 from "unacceptable" to "acceptable" by operation 313 of FIG. 3. The first electronic device 201 may control the first Bluetooth controller to process the message received from the external device 205 by using the vendor-specific command. According to an embodiment, when a value of 0x02 is transmitted by a command parameter using HCI_Write_Scan_Enable among HCI commands, the first electronic device 201 may change the page scan state of the first Bluetooth controller to "inquiry scan disabled/page scan enabled". The external device 205 may insert Bluetooth address information of the first electronic device 201 into an access code and broadcast the page message. The first electronic device 201 may perform control to receive the page message transmitted from the external device 205.

In operation 419, the first electronic device 201 may be reconnected to the external device 205. The first electronic device 201 may transmit a response message of the page message received from the external device 205 to the external device 205. Since the external device 205 is configured to continuously transmit the page message after the release of the connection with the second electronic device 203 and the second electronic device 203 is configured to not transmit the response message of the page message, the first electronic device 201 may be reconnected to the external device 205 through the first network (e.g., Bluetooth) if the first electronic device 201 transmits the response message of the page message to the external device 205. Since the first electronic device 201 is connected to the external device 205 on the basis of Bluetooth address information of the first electronic device 201 and the link key, the external device 205 may recognize the connection with the first electronic device 201 in all of operation 321 of FIG. 3 and operation 419 of FIG. 4.

Figure 5:
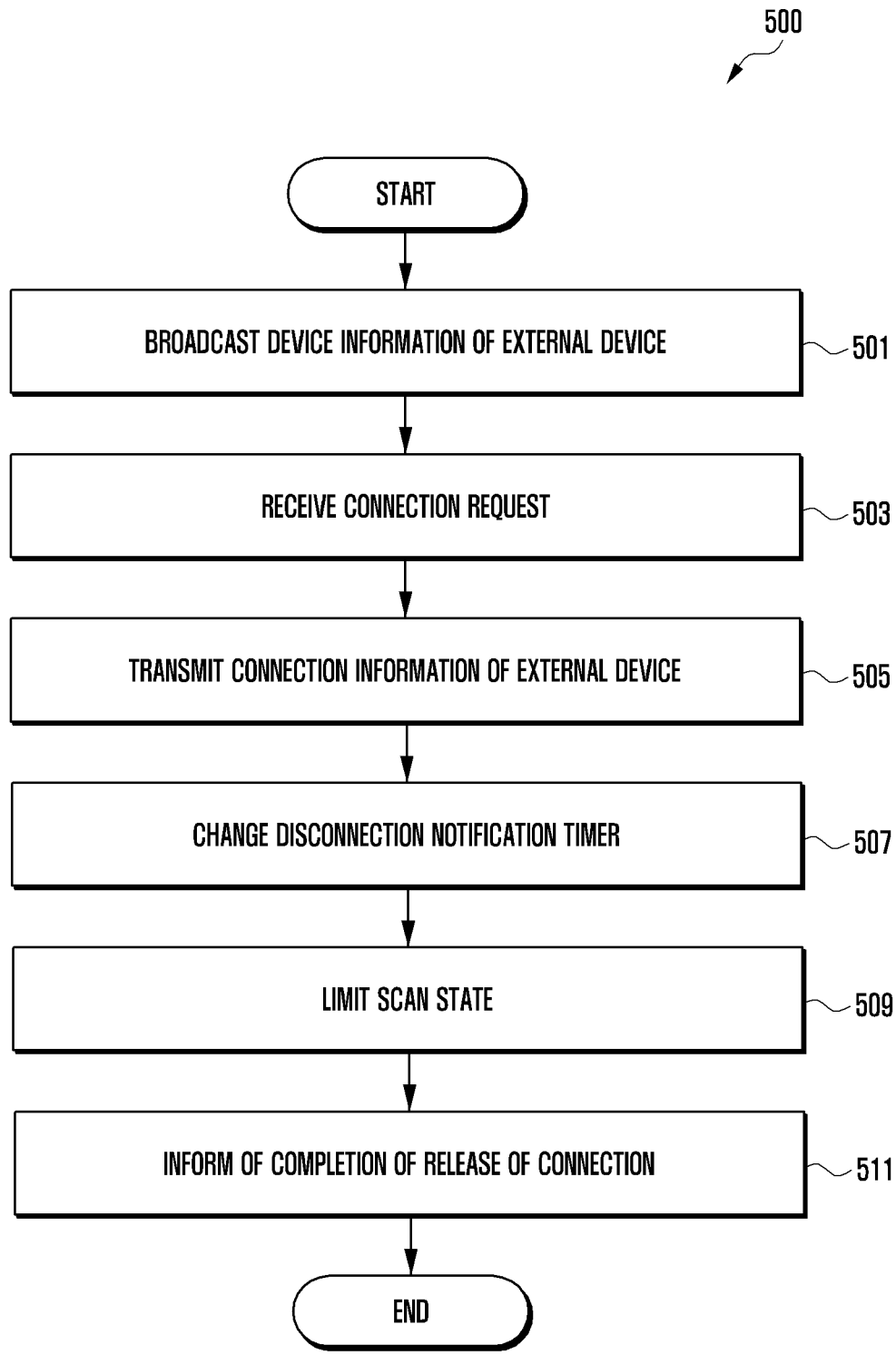
FIG. 5 is a flowchart illustrating a method by which a first electronic device releases a connection with an external device according to certain embodiments of the disclosure.

FIG. 5 is a flowchart 500 illustrating a method by which a first electronic device releases a connection with an external device according to certain embodiments.

Referring to FIG. 5, in operation 501, a processor (e.g., the processor 120 of FIG. 1) of a first electronic device (e.g., the electronic device 101 of FIG. 1 or the first electronic device 201 of FIG. 2) according to various embodiments may broadcast device information of the external device 205 through a communication module (e.g., the communication module 190 of FIG. 1) in the state of the connection with the external device (e.g., the external device 205 of FIG. 1). The state of the connection with the external device 205 may be a state in which a process of generating link keys required for an authentication procedure between the first electronic device 201 and the external device 205 and exchanging the link keys is completed.

The external device 205 may be a device capable of being connected to the first electronic device 201 through Bluetooth and exchanging information with the first electronic device 201. According to various embodiments, the processor 120 may be connected to the external device 205 via the communication module (e.g., the communication module 190 of FIG. 1) through a first network. The first network may correspond to one of the first networks 198 of FIG. 1, and may be, e.g., "Bluetooth". The processor 120 may transmit device information of the external device 205 through a second network in the state of the connection with the external device 205 through the first network.

The second network may correspond to one of the first network 198 or the second network 199 of FIG. 1. The second network used for transmitting the device information may be different from the first network used for the connection with the external device 205. The device information of the external device 205 may include at least one of a name related to the external device 205, an identifier, or a supported profile service. The processor 120 may inform at least one external electronic device (e.g., the electronic device 102 and the electronic device 104 of FIG. 1) located therearound that there is a device which can be connected as the external device 205.

The processor 120 may transmit device information of the external device 205 connected to the first electronic device 201 through a communication module (e.g., the communication module 190 of FIG. 1). The at least one external electronic device may be a device saved in contacts stored in a memory 130 of the first electronic device 201. The at least one external electronic device sometimes referred to herein as, another electronic device, a second electronic device, or a third electronic device to be distinguished from the first electronic device 201. Hereinafter, for ease of description, the external electronic device will be referred to as a "second electronic device".

According to certain embodiments, the processor 120 may recognize (or identify) the existence of the second electronic device 203 through one of the first network 198 or the second network 199 of FIG. 1 and transmit the device information to the recognized second electronic device 203. For example, the processor 120 may receive a BLE advertising event transmitted from the second electronic device 203 and recognize the existence of the second electronic device 203. According to an embodiment, the processor 120 may receive a packet including Bluetooth address information of the second electronic device 203 from the second electronic device 203 through WiFi aware, interwork with a server (e.g., the server 108 of FIG. 1) to recognize the existence of the second electronic device 203 transmitting the packet, or recognize the existence of the second electronic device 203 through NFC tagging. The processor 120 may recognize the second electronic device 203 located therearound on the basis of information on the strength of various network signals (RSSI) detected during a process of searching for various networks.

In operation 503, the processor 120 may receive a request for the connection with the external device 205 from the second electronic device 203 via a communication module (e.g., the communication module 190 of FIG. 1) through the second network. The second electronic device 203 may be a device transmitting the connection request among at least one external electronic device located around the first electronic device 201. The second electronic device 203 may display the device information broadcasted in operation 501 on the display and receive the connection request from the user. The second electronic device 203 may transmit the request for the connection with the external device 205 to the first electronic device 201 on the basis of a user input.

According to various embodiments, since the processor 120 broadcasts the device information of the external device 205 to the periphery, a plurality of external electronic devices may receive the device information. The plurality of external electronic devices may transmit the connection request for the device information. When receiving a plurality of connection requests, the processor 120 may display the plurality of external electronic devices making the connection requests on the display (e.g., the display device 160 of FIG. 1). The processor 120 may receive selection of one device (e.g., the second electronic device 203) from the user from among the plurality of displayed external electronic devices and then transmit connection information of the external device 205.

According to various embodiments, at least one external electronic device (e.g., the second electronic device 203) may receive device information of the external device 205 from the first electronic device 201 to make a connection request, but may have difficulty in being connected (paired) with the first electronic device 201 since a distance from the first electronic device 201 is long. When receiving the connection request, the processor 120 of the first electronic device 201 may check a possibility of the connection with at least one external electronic device transmitting the connection request. For example, the processor 120 may filter at least one external electronic device which can be connected on the basis of information on the strength of signals (RSSI) from at least one external electronic device. Alternatively, the processor 120 may display the state (e.g., signal strength information (RSSI)) of at least one external electronic device transmitting the connection request on the display device 160, receive selection of one device (e.g., the second electronic device 203) from the user, and then transmit connection information of the external device 205.

In operation 505, the processor 120 may transmit connection information of the external device 205 to the second electronic device 203 through the second network. The processor 120 may transmit connection information of the external device 205 to the second electronic device 203 transmitting the connection request among at least one external electronic device located around the first electronic device 201. The connection information may include Bluetooth address information and a link key of the first electronic device 201. The Bluetooth address information may be unique information used when the first electronic device 201 is connected (or paired) with the external device 205. The link key may be used for an authentication when a profile service between the electronic device 101 and the external device 205 is connected. The processor 120 may transmit the connection information to the second electronic device 203 through a secure channel (e.g., WiFi aware). The second electronic device 203 may receive the connection information and store the same in a memory (e.g., the memory 130 of FIG. 1). Transmission of the connection information by the first electronic device 201 may mean that a right to use the external device 205 is assigned to the second electronic device 203

According to various embodiments, the processor 120 may assign a right to use the external device 205 to the second electronic device 203 and transmit data (e.g., output data) provided (or transmitted) to the external device 205 to the second electronic device 203. For example, when the first electronic device 201 plays music through the external device 205, the processor 120 may transmit data related to the music to the second electronic device 203. When the music corresponds to a streaming service, the processor 120 may transmit information (e.g., a URL) related to the streaming service to the second electronic device 203.

According to an embodiment, when a music file stored in the memory 130 is output through the external device 205, the processor 120 may transmit the music file to the second electronic device 203. The processor 120 may transmit the music file to the second electronic device 203 on the basis of a configuration of the user or a configuration of the first electronic device 201. According to an embodiment, the processor 120 may determine whether to transmit the data to the second electronic device 203 on the basis of attributes of the data provided to the external device 205. For example, the processor 120 may transmit the data to the second electronic device 203 when the right to use (e.g., a user ID and password) is not needed for the data, and may not transmit the data to the second electronic device 203 when the right to use is needed for the data.

In operation 507, the processor 120 may change a disconnection notification timer. The disconnection notification timer may be a configuration value (e.g., supervision timeout) for releasing the connection with the external device 205. For example, in the Bluetooth standard, a signal may be exchanged between two devices connected through Bluetooth according to value configured in "supervision timeout". In the Bluetooth standard, supervision timeout may be determined within a range from 0.625 ms to 40.9 s. The processor 120 may configure the disconnection notification timer to be shorter than before in order to allow the external device 205 to rapidly recognize the release of the connection with the first electronic device 201 after the connection with the external device 205 is released.

For example, when the disconnection notification timer with the external device 205 is configured as '2 seconds', the processor 120 may change the disconnection notification timer into the smallest time (e.g., 0.625 ms) within a time range (e.g., 0.625 ms to 40.9 s) that can be configured as the disconnection notification timer. In another example, the first electronic device 201 may change the disconnection notification timer into a multiple of 0.625 ms (e.g., 0.625 ms*N, N being a natural number) within the time range (e.g., 0.625 ms to 40.9 s) that can be configured as the disconnection notification timer.

When the disconnection notification timer is changed to be shorter from 2 seconds to 0.625 ms, the external device 205 may attempt a signal exchange with the first electronic device 201 at a time corresponding to 0.625 ms after the signal exchange and thus rapidly recognize the release of the connection with the first electronic device 201. For example, the external device 205 may maintain the connection when the signal exchange with the first electronic device 201 is normally performed at every 0.625 ms, and may determine that the connection with the first electronic device 210 is released (e.g., link loss) when the signal exchange is not normally performed.

According to various embodiments, after transmitting the connection information to the second electronic device 203, the processor 120 may perform operation 507 for a predetermined time. The predetermined time may be after a certain time from transmission of the connection information to the second electronic device 203. According to an embodiment, when receiving a message indicating that preparation of the connection with the external device 205 from the second electronic device 203 after the connection information is transmitted to the second electronic device 203, the processor 120 may perform operation 507.

In operation 509, the processor 120 may limit the scan state. The processor 120 may induce artificial release of the connection with the external device 205 without performing "connection release for each profile service" or "asynchronous connection link (ACL) connection release" that is the general connection release method. When the external device 205 does not receive a signal from the first electronic device 201 during the disconnection notification timer, the external device may determine that the connection with the first electronic device 201 is released. The external device 205 may insert Bluetooth address information of the first electronic device 201 into an access code and broadcast a page message for a reconnection with the first electronic device 201. The processor 120 may limit the scan state of the Bluetooth controller (e.g., the first Bluetooth controller) not to transmit a response message of the page message.

For example, the processor 120 may control the first Bluetooth controller to not process a packet received from the external device 205 through a vendor-specific command. The vendor-specific command is a command from a Bluetooth host to a controller, which is not defined in the specification, and may be a command defined by a manufacturer that manufactures a corresponding chip. When it is determined that the connection with the external device 205 is released, the processor 120 may switch to the page scan state in which the page message can be received from the external device 205. The external device 205 (e.g., a master device) may transmit the page message, and the first electronic device 201 (e.g., a slave device) may transmit the response message of the page message. The processor 120 may limit the page scan state to not transmit the response message. The external device 205 may transmit the page message continuously until the response message of the page message is received.

According to various embodiments, the processor 120 may limit the page scan state by using a Bluetooth HCI command. The Bluetooth HCI command may be identified as a 16-bit command code, and the vendor-specific command may be defined as a value within a range from 0x0000 to 0xFBFF according to the Bluetooth standard. The processor 120 may limit the page scan state by the first Bluetooth controller by using values within a range from 0xFC00 to 0xFFFF, that is, 1024 commands as the vendor-specific commands. When a value of 0x00 is transmitted by a command parameter by using HCI_Write_Scan_Enable among HCI commands, the processor 120 may configure the page scan state of the first Bluetooth controller as "no scans enabled".

When the first electronic device 201 transmits the response message in response to the page message transmitted from the external device 205, the first electronic device 201 may be connected to the external device 205 again. The first electronic device 201 may perform control to not transmit the response message to the external device 205 in order to allow the second electronic device 203 to be connected to the external device 205 instead of the first electronic device 201. According to various embodiments, the processor 120 may turn off a "Bluetooth function" of the first electronic device 201.

According to an embodiment, the second electronic device 203 may transmit the response message to the external device 205 on the basis of connection information received through operation 505 while the first electronic device 201 performs control to not transmit the response message, so that the second electronic device 203 may be connected to the external device 205.

In operation 511, the processor 120 may inform the second electronic device 203 of the connection release. The processor 120 may release the connection with the external device 205 and inform the second electronic device of the connection release in order to allow the second electronic device 203 to be connected to the external device 205 while performing control to not process the message received from the external device 205. The external device 205 may insert Bluetooth address information of the first electronic device 201 into an access code and broadcast a page message for a reconnection with the first electronic device 201. When receiving the connection release, the second electronic device 203 may receive the page message of the external device 205 received by Bluetooth address information of the first electronic device 201 through the virtual Bluetooth controller. The second electronic device 203 may decrypt an encrypted packet received from the external device 205 by using the link key and transmit the response message of the page message received by the virtual Bluetooth controller to the external device 205, so as be connected to the external device 205. According to various embodiments, the second electronic device 203 may provide (or output) data to the external device 205 on the basis of data received along with the connection information.

Figure 6A:
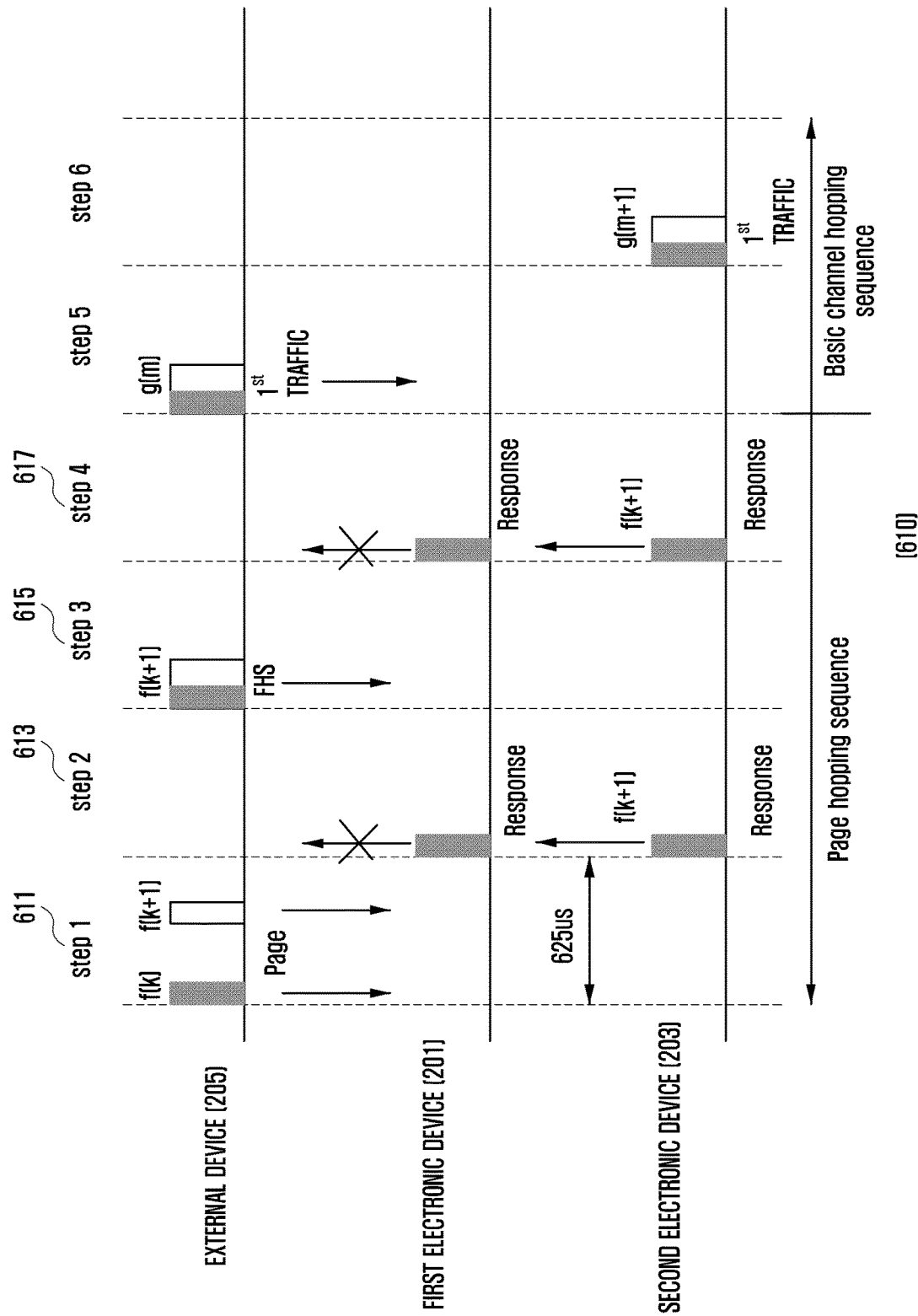

FIGS. 6A to 6C illustrate an example in which a first electronic device limits a scan state according to various embodiments.

FIG. 6A illustrates a page hopping sequence 610 according to various embodiments.

Referring to FIG. 6A, Bluetooth may configure a link in a master and slave type. The master may serve as a base station, and the slave may be synchronized with a clock of the master in a frequency hopping scheme. The slave may communicate according to a hopping sequence of the master. Referring to the page hopping sequence 610, when release of a link with a first electronic device (e.g., the electronic device 101 of FIG. 1 or the first electronic device 201 of FIG. 2) is recognized, an external device (e.g., the external device 205 of FIG. 2) according to various embodiments may broadcast a page message (or a search message) to recognize the existence of the first electronic device 201 in step #1 611. In general, the first electronic device 201 is required to process a response message of the page message in step #2 613, but may perform control to not transmit the response message to the external device 205 in order to allow the second electronic device 203 to be connected to the external device 205.

In step #2 613, the second electronic device 203 (e.g., a virtual Bluetooth controller) may transmit the response message of the page message of the external device 205 on the basis of Bluetooth address information of the first electronic device 201. The external device 205 may transmit a master page response message to the second electronic device 203 transmitting the response message in step #3 615, and the second electronic device 203 may transmit a response message of the master page response message of the external device 205 in step #4 617, so that the external device 205 and the second electronic device 203 may be connected to each other.

FIG. 6B illustrates a hopping sequence specification 630 according to various embodiments.

Referring to FIG. 6B, in the hopping sequence specification 630, step #1 611 may be an operation in which the external device 205 (e.g., a master) broadcast a page message (e.g., an inquiry) using an ID packet one time or at every predetermined time in order to recognize neighboring slaves (e.g., the first electronic device 201 and the second electronic device 203). The ID packet may be a general inquiry access code (GIAC) or a dedicated inquiry access code (DIAC). In step #1 611, the external device 205 may insert Bluetooth address information of the first electronic device 201 into the ID packet and broadcast the page message. A virtual Bluetooth controller of the second electronic device 203 may enter a search standby (e.g., inquiry scan) state in order to receive the page message and then receive the page message.

Step #2 613 may be an operation in which the second electronic device 203 receiving the page message transmits a response message (e.g., a first slave page response) using the ID packet to the external device 205.

Step #3 615 may be an operation in which the external device 205 transmits an inquiry response message using a frequency hop synchronization (FHS) packet to the second electronic device 203 transmitting the response message. The FHS packet may include Bluetooth address information of the external device 205, a service class, a device class (major device class and minor device class), and clock information.

Step #4 617 may be an operation in which the second electronic device 203 transmits a response message (e.g., a second slave page response) of the inquiry response message to the external device 205. Since the second electronic device 203 exchanges a message with the external device 205 through a link key received from the first electronic device 201, the second electronic device may be connected to the external device 205 without a separate search and authentication procedure. The external device 205 may recognize the second electronic device 203 as the first electronic device 201.

FIG. 6B illustrates examples of Bluetooth HCI commands according to various embodiments.

Referring to FIG. 6C, the first electronic device 201 may limit the page scan state to not transmit the response message of the page message received from the external device 205. The Bluetooth host controller interface (HCI) commands may be identified by a 16-bit command code, and the vendor-specific command may be defined as a value within a range from 0x0000 to 0xFBFF according to the Bluetooth standard. The first electronic device 201 may limit the page scan state by the first Bluetooth controller by using values in ranges from 0xFC00 to 0xFFFF, that is, 1024 commands as the vendor-specific commands.

For example, the first electronic device 201 may transfer a value of 0x00 by a command parameter (e.g., Scan_Enable) 651 using HCI_Write_Scan_Enable 650 among the HCI commands. Referring to a command parameter table 670, a value of 0x00 671 may configure the page scan state of the first Bluetooth controller of the first electronic device 201 as "no scans enabled". The page scan state configured as "no scans enabled" may mean the state in which the page scan by the first electronic device 201 and neighboring devices is blocked.

According to various embodiments, the first electronic device 201 may change the page scan state to transmit the response message of the page message received from the external device 205 for the reconnection with the external device 205. For example, the first electronic device 201 may transfer a value of 0x02 by the command parameter (e.g., Scan_Enable) 651 using HCI_Write_Scan_Enable 650 among the HCI commands. The value of 0x02 673 may configure the page scan state of the first Bluetooth controller of the first electronic device 201 as "inquiry scan disabled/page scan enabled". The page scan state configured as "inquiry scan disabled/page scan enabled" may mean the state in which the search for the first electronic device 201 by neighboring devices is blocked and the first electronic device 201 transmits the response message of the page message.

Figure 7:
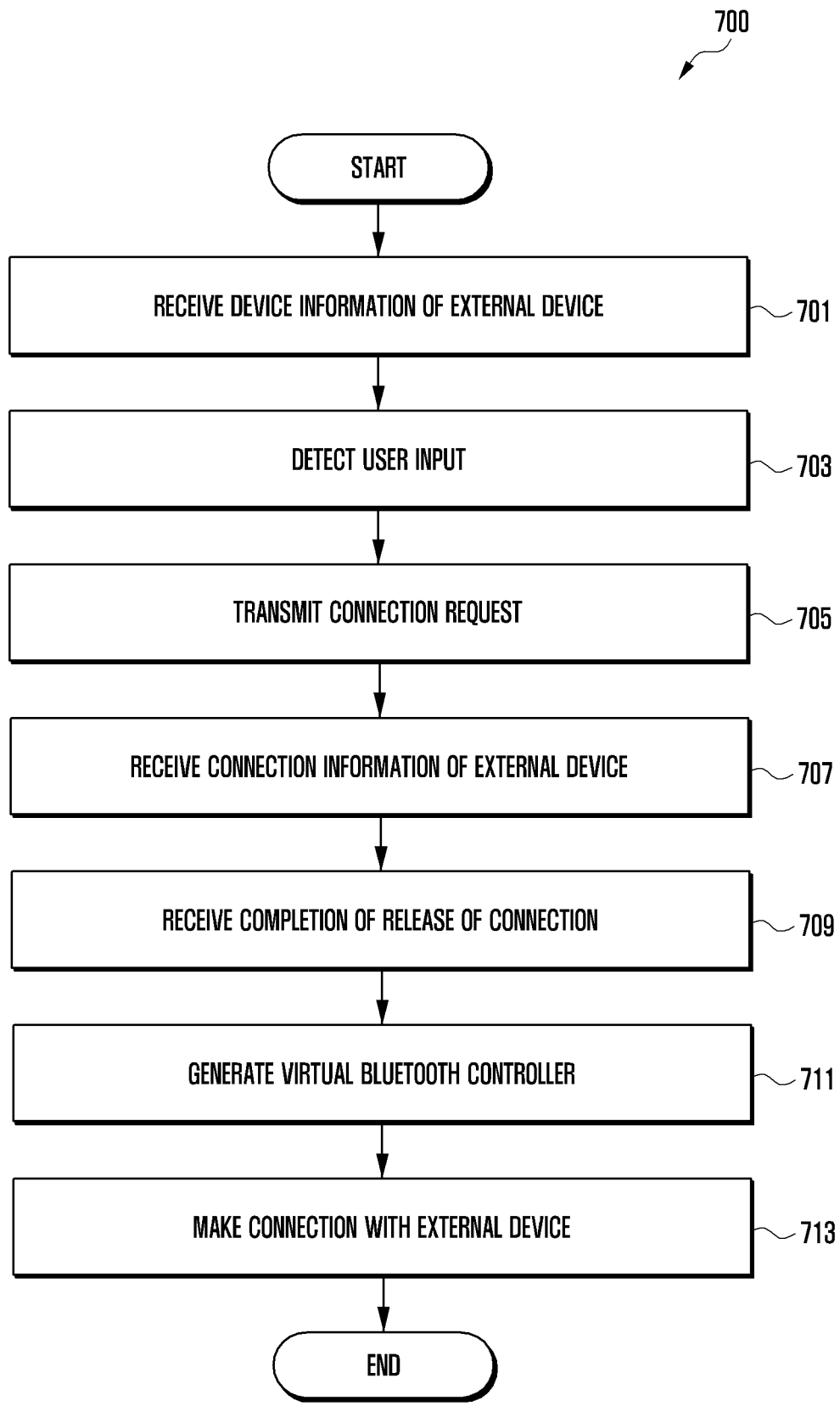
FIG. 7 is a flowchart illustrating a method by which a second electronic device is connected to an external device according to certain embodiments of the disclosure.

FIG. 7 is a flowchart 700 illustrating a method by which a second electronic device is connected to an external device according to various embodiments.

Referring to FIG. 7, in operation 701, a processor (for example, the processor 120 of FIG. 1) of a second electronic device (for example, the electronic device 101 of FIG. 1 or the second electronic device 203 of FIG. 2) may receive device information of an external device (for example, the external device 205 of FIG. 2). The processor 120 of the second electronic device 203 may receive device information of the external device 205 from a first electronic device (for example, the electronic device 101 of FIG. 1 or the first electronic device 201 of FIG. 2) through a second network The device information is related to information on the external device 204 connected to the first electronic device 101, 201, and the device information of the external device 205 may include, e.g., at least one of a name related to the external device 205, an identifier, or a supported profile service. The processor 120 may receive device information of the external device 205 connected to the first electronic device 101, 201 from the first electronic device 101, 201.

According to various embodiments, the processor 120 of the second electronic device 203 may transmit a BLE advertising event to the first electronic device 101, 201 and receive the device information in response to the transmitted event. According to an embodiment, the processor 120 of the second electronic device 102, 203 may transmit a packet (or a message) including Bluetooth address information of the second electronic device 101, 203 through WiFi aware and receive the device information in response to the transmitted information. The processor 120 of the second electronic device 102, 203 may receive the device information from a server (e.g., the server 108 of FIG. 1) or receive the device information through NFC tagging with the first electronic device 201. The processor 120 of the second electronic device 102, 203 may transmit a message to the first electronic device 101, 201 by controlling information on the strength of various network signals (received signal strength indication (RSSI)) detected during a process of searching for various networks and receive the device information in response to the transmitted message.

In operation 703, the processor 120 of the second electronic device 102, 203 may detect a user input. The processor 120 of the second electronic device 102, 203 may display the received device information of the external device 205 on a display (e.g., the display device 160 of FIG. 1). The processor 120 of the second electronic device 101, 203 may detect (or receive) a user input of selecting (or touching) the device information from the user.

In operation 705, the processor 120 of the second electronic device 101, 203 may transmit a request for the connection with the external device 205 to the first electronic device 101, 201 through a communication module 190 of the second electronic device 102, 203 in response to the user input. The processor 120 of the second electronic device 102, 203 may transmit the request for the connection with the external device 205 to the first electronic device 101, 201 through the second network. The second network may correspond to one of the first network 198 or the second network 199 of FIG. 1. The second network may be different from the first network used for the connection with the external device 205. For example, the second network may use one of various types of networks (e.g., Bluetooth low energy, WiFi direct, WiFi aware, or cellular network) which are not used for the first network among the first network 198 or the second network 199.

In operation 707, the processor 120 of the second electronic device 102, 203 may receive connection information of the external device 205 from the first electronic device 101, 201 through the communication module 190 of the second electronic device 102, 203. The connection information may include Bluetooth address information and a link key of the first electronic device 101, 201. The Bluetooth address information may be unique information used when the first electronic device 101, 201 is connected (or paired) with the external device 205. The link key may be information used for the authentication when a profile service between the electronic device 101 and the external device 205 is connected. The processor 120 of the second electronic device 102, 203 may receive the connection information from the first electronic device 101, 201 through a secure channel (e.g., WiFi aware). The processor 120 may receive the connection information and store the same in a memory 130.

In operation 709, the processor 120 of the second electronic device 23 may receive completion of the release of the connection (or the release of the link) from the first electronic device 201 through the communication module 190 of the second electronic device 203. After changing and configuring a disconnection notification timer with the external device 205 and configuring a message received from the external device 205 to not be processed, the first electronic device 201 may transmit the connection release completion to the second electronic device 203. The processor 120 of the second electronic device 203 may identify that the first electronic device 201 is completely connected to the external device 205 and perform operation 711. According to an embodiment, when receiving connection information of the external device 205 from the first electronic device 201 or receive completion of the release of the connection with the external device 205 from the first electronic device 201, the processor 120 of the second electronic device 203 may activate a first communication network (e.g., Bluetooth).

In operation 711, the processor 120 of the second electronic device 203 may generate a virtual Bluetooth controller. The second electronic device 203 may include a Bluetooth controller (e.g., a second Bluetooth controller) which can be connected to the external device through Bluetooth like the first electronic device 201. The second Bluetooth controller may be connected to the external device on the basis of Bluetooth address information of the second electronic device 203, and the virtual Bluetooth controller may be connected to the external device 205 on the basis of Bluetooth address information of the first electronic device 201.

According to various embodiments, the processor 120 of the second electronic device 203 may transfer connection information to the virtual Bluetooth controller by using a vendor-specific command. The virtual Bluetooth controller may be configured to be connected to the external device 205 on the basis of the connection information. For example, the processor 120 of the second electronic device 203 may switch the virtual Bluetooth controller to the page scan state and configure the same to receive a page message transmitted from the external device 205 by the page scan state.

In operation 713, the processor 120 of the second electronic device 203 may receive the page message transmitted from the external device 205 and make a connection with the external device 205. The processor 120 of the second electronic device 203 may be connected to the external device 205 on the basis of the connection information. The processor 120 of the second electronic device 203 may transmit a response message of the page message received by the virtual Bluetooth controller to the external device 205. The external device 205 may continuously transmit the page message after the release of the connection with the first electronic device 201. The processor 120 of the second electronic device 203 may transmit the response message of the page message to the external device 205 through the virtual Bluetooth controller and thus may be connected to the external device 205 through the first network (e.g., Bluetooth). The processor 120 of the second electronic device 203 may decrypt an encrypted packet received from the external device 205 through the link key and may be connected to the external device 205 on the basis of Bluetooth address information of the first electronic device 201 by the virtual Bluetooth controller. According to an embodiment, the external device 205 may recognize the second electronic device 203 as the first electronic device 201. The second electronic device 203 may be rapidly connected to the external device 205 on the basis of the connection information without a need to perform a discovery process and a mutual key authentication procedure with the external device 205.

Figure 8:
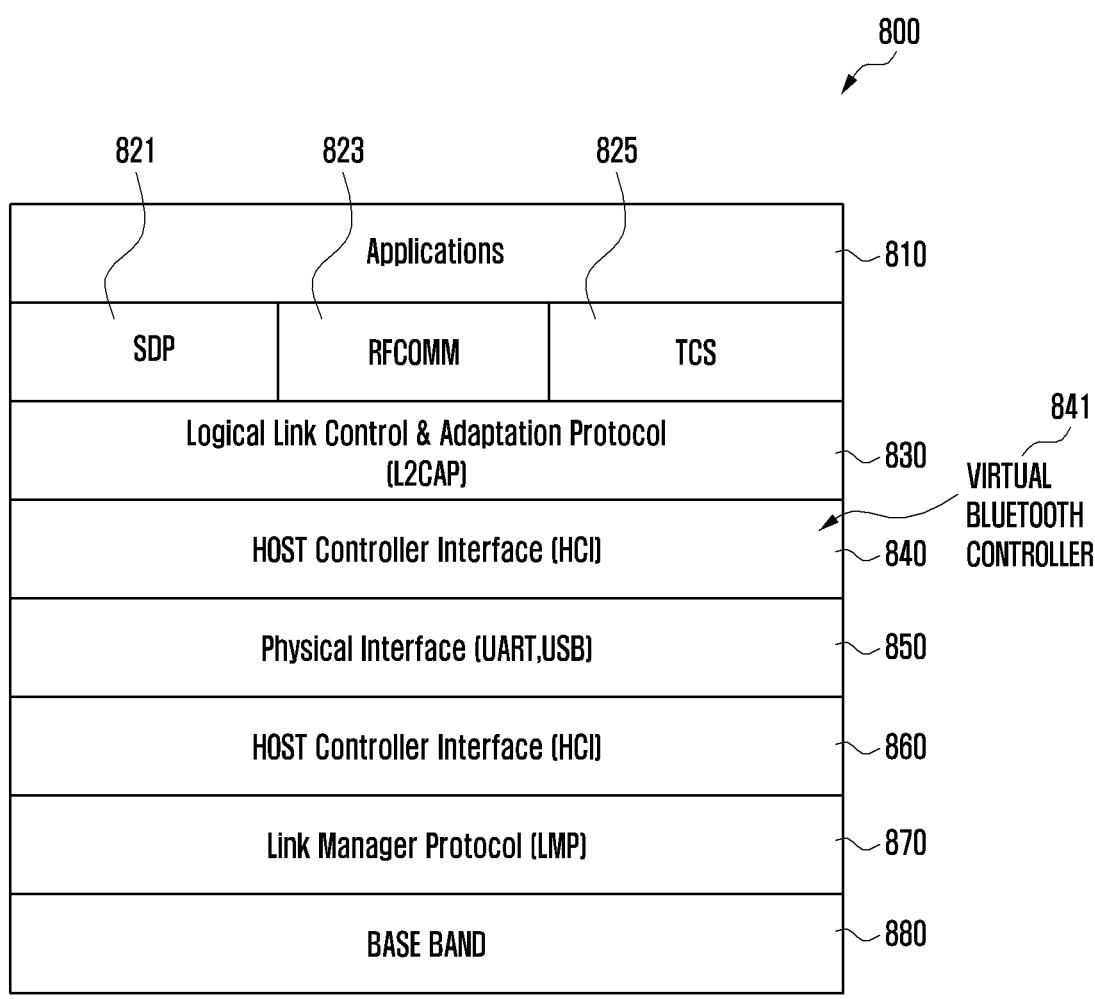
FIG. 8 illustrates a Bluetooth protocol stack according to certain embodiments of the disclosure.

FIG. 8 illustrates a Bluetooth protocol stack 800 from a lower stack layer to a higher stack layer, according to certain embodiments.

Referring to FIG. 8, the Bluetooth protocol stack 800 may be a set of protocols stacked from a lower layer to a higher layer. The Bluetooth protocol stack 800 is discussed herein primarily to assist in the understanding of the disclosure, and may be implemented in various forms. For example, the Bluetooth protocol stack 800 may include one or more of the following in its various forms: applications 810 (e.g., the applications 146 of FIG. 1), a service discovery protocol (SDP) 821, radio frequency communications (RFCOMM) 823, a telephony control protocol specification (TCS) 825, a logical link control and adaption protocol (L2CAP), asynchronous connection oriented logical (ACL) 830, a host controller interface (HCI) 840, a physical interface 850, an HCI 860, a link manager protocol (LMP) 870, and a baseband 880.

The SDP 821 may include a service type or service attributes. The RFCOMM 823 is a protocol made to replace a serial line port such as the existing wired RS-232 and may be similar to the transmission control protocol (TCP). The TCS 825 is a necessary protocol to implement '3-in-1 Phone' which is one of applications of Bluetooth and may be a phone control protocol for interfacing a public switched telephone network (PSTN) or an intercom. The L2CAP 830 may serve to intervene between and control a higher layer protocol and the HCI 840 or a lower protocol such as the baseband 880. For example, the L2CAP 830 may perform multiplexing, segmentation, reassembly, and quality of service (QoS).

The Bluetooth protocol stack 800 may be divided into a host controller protocol and a host protocol from the HCI 840. In the Bluetooth protocol stack 800, the HCI may be located in two layers, and the HCI 860 may be included in the host controller and belong to the host. The HCI 840 and the HCI 860 may be connected through a physical interface 850 that is a physical link. The host controller (e.g., the HCI 860) may correspond to a Bluetooth module, and the host controller protocol may include the HCI 860, the LMP 870, and the baseband 880. The host controller protocol may be included in the Bluetooth module in the form of firmware.

The second electronic device 203 may generate a virtual Bluetooth controller 841 for the connection with the external device 205 on the basis of Bluetooth address information of the first electronic device 201. The virtual Bluetooth controller 841 may be generated in the HCI 840. In the connection with the external device 205, the host (e.g., the HCI 840) may separate the external device 205 by HCI handle uploaded by the controller (e.g., the HCI 860). The second electronic device 203 may generate the virtual Bluetooth controller 840 by only modifying firmware for controlling the controller. The second electronic device 203 may perform time division on the Bluetooth controller (e.g., the second Bluetooth controller) conventionally included in the second electronic device 203 and the virtual Bluetooth controller 841 and alternately use the second Bluetooth controller and the virtual Bluetooth controller 841 for a channel slot.

Figure 9:
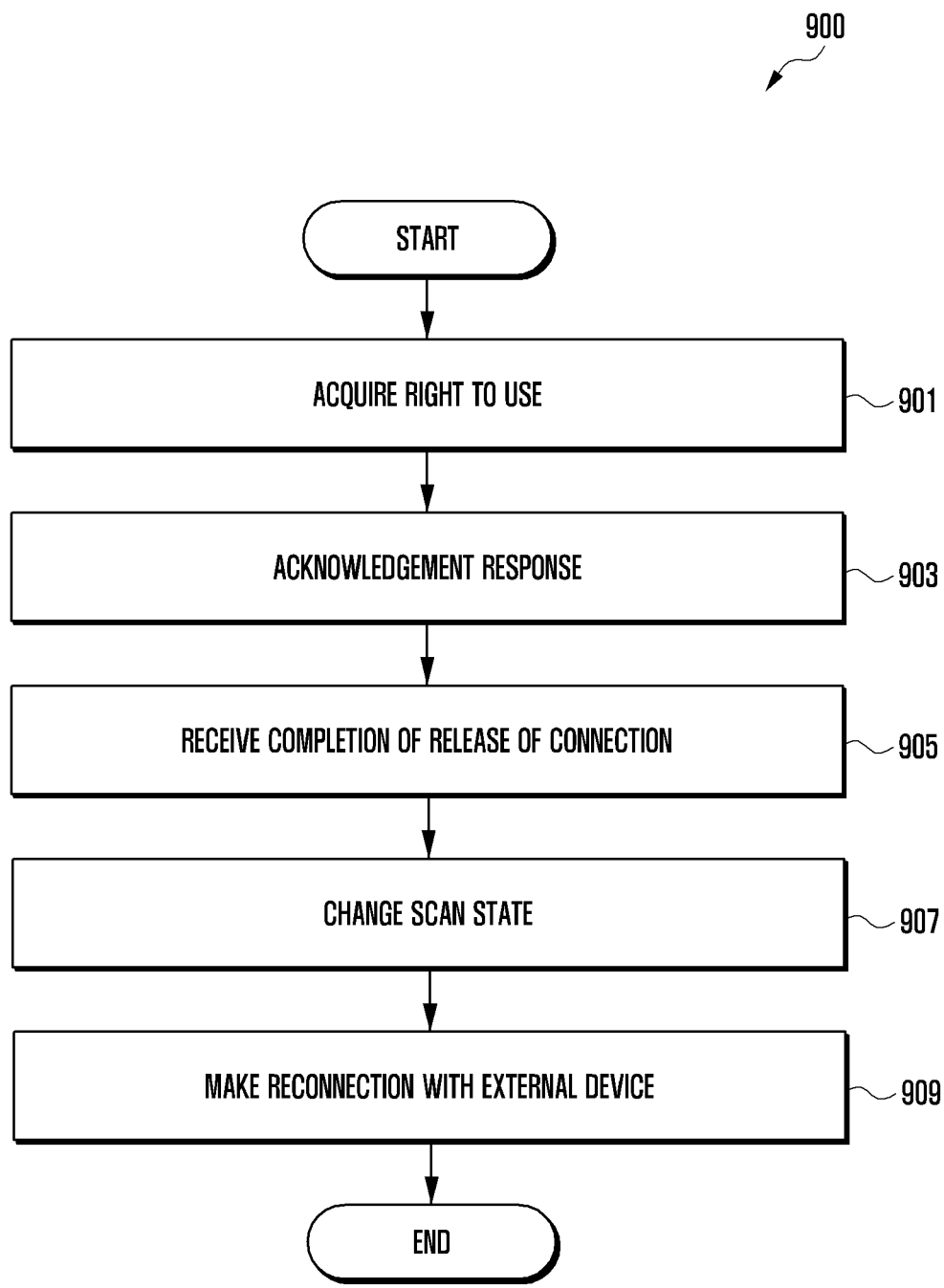
FIG. 9 is a flowchart illustrating a method by which a first electronic device is reconnected to an external device according to certain embodiments of the disclosure.

FIG. 9 is a flowchart 900 illustrating a method by which a first electronic device 201 is reconnected to an external device 205 according to certain embodiments.

Referring to FIG. 9, in operation 901, a processor (e.g., the processor 120 of FIG. 1) of a first electronic device, for example, the electronic device 101 of FIG. 1 or the first electronic device 201 of FIG. 2) may acquire a so-called "right to use". The right to use is a right to use an external device (e.g., the external device 205 of FIG. 2) and may be assigned to the second electronic device (e.g., the electronic device 101 of FIG. 1 or the second electronic device 203 of FIG. 2) by the operation of FIG. 3. The processor 120 of the first electronic device 201 may acquire the right to use from the second electronic device through the second network in a state in which the connection with the external device 205 has been released. In operation 901, the first electronic device 201 may not be connected with the external device 205, but the second electronic device 203 may be connected (or paired) with the external device 205. The second electronic device 203 may release the connection with the external device 205 according a request from the user. The second electronic device 203 may control the first electronic device 201 to prepare the connection with the external device 205 by returning the "right to use" to the first electronic device 201 before the connection with the external device 205 is released.

According to an embodiment, when the user of the first electronic device 201 makes a request for the "right to use" again or when the network between the second electronic device 203 and the external device 205 is disconnected (e.g., disconnection due to turning-off of power of the second electronic device 203) or a possibility of disconnection is high on the basis of the strength of a signal of the second electronic device 203, the processor 120 of the first electronic device 201 may make a request for the "right to use" to the second electronic device 203.

In operation 903, the processor 120 of the first electronic device 201 may transmit an acknowledgement response to the second electronic device 203 through a communication module (e.g., the communication module 190 of FIG. 1). According to an embodiment, the processor 120 of the first electronic device 201 may display on a display device, the return of "the right to use" (e.g., the display device 160 of FIG. 1) and transmit an acknowledgement signal for the return of the "right to use" through the second network on the basis of a user input. According to an embodiment, when receiving the return of the "right to use" on the basis of a configuration of the first electronic device 201 or a configuration of the user, the processor 120 may automatically transmit the acknowledgement signal. For example, the processor 120 may transmit the acknowledgement signal in the background without any identification by the user.

In operation 905, the processor 120 of the first electronic device 201 may receive completion of the release of the connection with the external device 205 from the second electronic device 203 through the communication module 190. The processor 120 of the first electronic device 201 may receive completion of the release of the connection with the external device 205 from the second electronic device 203 through the second network.

In operation 907, the processor 120 of the first electronic device 201 may switch the scan state. The processor 120 of the first electronic device 201 may configure processing of reception of the message from the external device 205 as "unacceptable" for the connection between the second electronic device 203 and the external device 205. However, the processor 120 of the first electronic device 201 may change the processing of reception of the message from "unacceptable" to "acceptable" in response to completion of the release of the connection. The processor 120 of the first electronic device 201 may command the first Bluetooth controller to process the message received from the external device 205 by using a vendor-specific command.

Alternatively, when a value of 0x02 is transmitted by a command parameter using HCIWrite_Scan_Enable which is a command from among the set of HCI commands, the processor 120 of the first electronic device 201 may change the page scan state of the first Bluetooth controller to "inquiry scan disabled/page scan enabled". The external device 205 may insert Bluetooth address information of the first electronic device 201 into an access code and broadcast the page message. The processor 120 of the first electronic device 201 may perform control to receive the page message transmitted from the external device 205 through the communication module 190.

In operation 909, the processor 120 of the first electronic device 201 may be reconnected to the external device 205. The processor 120 of the first electronic device 201 may transmit a response message of the page message received from the external device 205 to the external device 205 through the communication module 190. Since the external device 205 is configured to continuously transmit the page message after the release of the connection with the second electronic device 203 and the second electronic device 203 is configured to not transmit the response message of the page message, the first electronic device 201 may be reconnected to the external device 205 through the first network (e.g., Bluetooth) if the first electronic device 201 transmit the response message of the page message to the external device 205. The processor 120 of the first electronic device 201 may be reconnected to the external device 205 by using Bluetooth address information of the first electronic device 201 and the link key.

Figure 10:
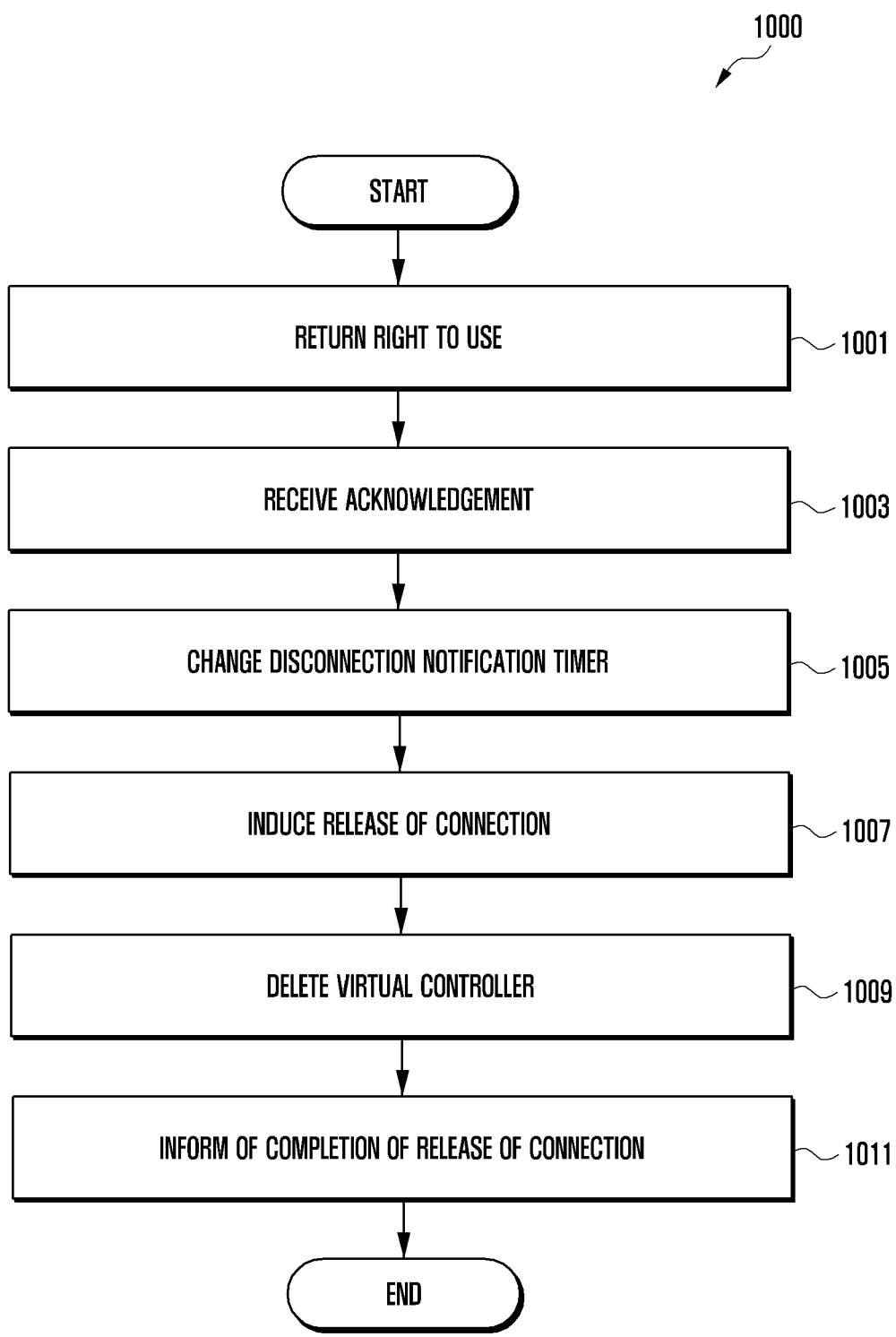
FIG. 10 is a flowchart illustrating a method by which a second electronic device releases a connection with an external device according to certain embodiments of the disclosure.

FIG. 10 is a flowchart 1000 illustrating a method by which a second electronic device releases a connection with an external device according to various embodiments.

Referring to FIG. 10, in operation 1001, a processor (e.g., the processor 120 of FIG. 1) of a second electronic device (e.g., the electronic device 101 of FIG. 1 or the second electronic device 203 of FIG. 2) may return a right to use the external device 205 to a first electronic device (e.g., the electronic device 101 of FIG. 1 or the first electronic device 201 of FIG. 2). The right to use is a right to use the external device 205 and may be a right received from the first electronic device 201. The processor 120 of the second electronic device 203 may release the connection with the external device 205 according to a user request. The processor 120 of the second electronic device 203 may control the first electronic device 201 to prepare the connection with the external device 205 by returning the right to use to the first electronic device 201 before the release of the connection with the external device 205.

In operation 1003, the processor 120 of the second electronic device 203 may receive an acknowledgement signal from the first electronic device 201 through a communication module (e.g., the communication module 190 of FIG. 1) of the second electronic device 201. The processor 120 of the second electronic device 203 may receive the acknowledgement signal corresponding to the return of the right to use through the second network. According to an embodiment, the first electronic device 201 may display a user interface for the return of the right to use on a display (e.g., the display device 160 of FIG. 1) and transmit the acknowledgement signal for the return of the right to use to the second electronic device 203 on the basis of a user input. According to an embodiment, the first electronic device 201 may transmit the acknowledgement signal in the background without any identification by the user on the basis of a configuration of the first electronic device or a configuration of the user.

In operation 1005, the processor 120 of the second electronic device 203 may change a disconnection notification timer with the external device 205. The processor 120 of the second electronic device 203 may release the connection with the external device 205 in order to allow the first electronic device 201 to be connected to the external device 205. When the disconnection notification timer between the second electronic device 203 and the external device 205 is configured as '2 seconds', the second electronic device 203 and the external device 205 may exchange a signal in every 2 seconds.

The processor 120 of the second electronic device 203 may maintain the connection when a signal exchange with the external device 205 is normally performed within a time configured in the disconnection notification timer, and may determine that the connection is released (e.g., link loss) when the signal exchange is not normally performed. According to various embodiments, since a subject to configure the disconnection notification timer is a "master" in the Bluetooth standard, the processor 120 of the second electronic device 203 may exchange the role with the external device 205 in order to change the disconnection notification timer.

In operation 1007, the processor 120 of the second electronic device 203 may induce the release of the connection with the external device 205. The processor 120 of the second electronic device 203 may configure the disconnection notification timer to be shorter than before to induce the external device 205 to be disconnected from the second electronic device 203. If there is no response during the changed disconnection notification timer, the second electronic device 203 and the external device 205 may consider that the connection is disconnected and may automatically release the link between the two devices. When the signal exchange with the second electronic device 203 is not normally performed (or the release of the connection is recognized), the external device 205 may broadcast a page message for the connection (or reconnection) with the second electronic device 203.

In operation 1009, the processor 120 of the second electronic device 203 may delete (or remove) the virtual Bluetooth controller. The virtual Bluetooth controller is generated to be connected to the external device 205 on the basis of Bluetooth address information of the first electronic device 201 and may be deleted when the connection with the external device 205 is released. When the connection with the external device 205 is released, the external device 205 may transmit a page message for a reconnection. When the virtual Bluetooth controller is not deleted, the page message is received, and thus the processor 120 of the second electronic device 203 may be configured to not process the message received from the external device 205 by the virtual Bluetooth controller. The processor 120 of the second electronic device 203 may delete the virtual Bluetooth controller on the basis of a vendor-specific command.

In operation 1011, the processor 120 of the second electronic device 203 may inform the first electronic device 201 of the release of the connection with the external device 205 through the second network. When receiving completion of the release of the connection with the external device 205 from the second electronic device 203, the first electronic device 201 may attempt the connection with the external device 205. The first electronic device 201 may change processing of reception of the message received from the external device 205 from "unacceptable" to "acceptable" and may be reconnected to the external device 205.

According to an embodiment, the first electronic device 201 may be an electronic device (e.g., a mobile phone) of an owner of a vehicle, the second electronic device 203 may be an electronic device (e.g., a mobile phone) of a passenger, and the external device 205 may be a car kit speaker within the vehicle. When power of the car kit is turned on, the external device 205 may be connected to the electronic device (e.g., the first electronic device 201) which had been last connected through the first network (e.g., Bluetooth) according to an operation concept of a manufacturer. When the second electronic device 203 attempts to use the external device 205, the second electronic device 203 may receive Bluetooth address information and the link key of the first electronic device 201 stored in the first electronic device 201 from the first electronic device 201 through the second network.

According to an embodiment, the first electronic device 201 may make a request for information for the connection with the external device 205 from the second electronic device 203. According to another embodiment, the first electronic device 201 may discover the existence of the second electronic device 203 near the first electronic device and transmit information on the external device 205, so as to allow the second electronic device 203 to be connected to the external device 205. The second electronic device 203 may output music output from a music application executed by the second electronic device 203 to the external device 205 by being connected to the external device 205 using the Bluetooth address information and the link key of the first electronic device 201.

According to another embodiment, the first electronic device 201 may be a device of an owner of a vehicle providing an Uber service or an electronic device (e.g., a tablet) within the vehicle, the second electronic device 203 may be a device of a customer using the Uber service, and the external device 205 may be a car kit speaker of the vehicle providing the Uber service. The second electronic device 203 may acquire Bluetooth address information of the first electronic device 201 through a server (e.g., the server 108 of FIG. 1) providing the Uber service and, when the second electronic device 203 enters the vehicle, the Bluetooth address information of the first electronic device 201 may be transmitted to BLE adverting event payload of the second electronic device 203. Accordingly, the first electronic device 201 may recognize the second electronic device 203 or may search for a BLE address of the second electronic device 203 received from the server and recognize the existence of the nearby second electronic device 203.

The second electronic device 203 may receive the link key through Wi-Fi Aware which is a secure channel and use a car kit speaker of the vehicle. According to another embodiment, the first electronic device 201 may store (or register) the link key between the first electronic device 201 and the external device 205 and the Bluetooth address information of the first electronic device in an Uber service providing server 108. When a vehicle is picked through an Uber application and the second electronic device 203 enters the corresponding vehicle, the first electronic device 201 connected to the vehicle may recognize the existence of the nearby second electronic device 203. When the first electronic device 201 updates boarding information in the server 108, the server 108 may transmit the link key and the Bluetooth address information of the first electronic device 201 to the second electronic device 203. The second electronic device 203 may use the speaker within the vehicle on the basis of the link key and the Bluetooth address information of the electronic device 201 received from the server 108.

According to another embodiment, the first electronic device 201 may be a tablet connected to a speaker within a store (e.g., café) through Bluetooth, the second electronic device 203 may be a device of a customer visiting the store, and the external device 205 may be an external speaker within the store. e.g., when the customer enters the store or on the basis of a request from the customer, the second electronic device 203 may receive Bluetooth address information and the link key from the first electronic device 201. According to an embodiment, the first electronic device 201 may make a request for information for the connection with the external device 205 from the second electronic device 203.

According to another embodiment, the first electronic device 201 may discover the existence of the second electronic device 203 near the first electronic device and transmit information on the external device 205, so as to allow the second electronic device 203 to be connected to the external device 205. The second electronic device 203 may output music output from a music application executed by the second electronic device 203 to the external device 205 by being connected to the external device 205 using the Bluetooth address information and the link key of the first electronic device 201.

According to another embodiment, public Bluetooth address information may be applied to a conference room or accommodation which can be reserved in advance or a rental car service. An example using Bluetooth address information within a conference room is described as one of the above applications. The second electronic device 203 is a device of a person who reserves a conference room and may reserve the conference room through a conference room reservation application. When reserving the conference room, the second electronic device 203 may store (or register) public Bluetooth address information and the link key can be connected to a speaker (e.g., the external device 205) within the conference room in the memory. When a reservation time arrives, power is applied to the external device 205, and thus the second electronic device 203 may be connected to the external device 205 on the basis of the public Bluetooth address information. When the second electronic device 203 enters the conference room, the second electronic device may be controlled to use the external device 205.

Various embodiments of the disclosure disclosed in the specifications and drawings present specific examples for ease of description of the technical content of the disclosure and to help understanding of the disclosure, but are not intended to limit the scope of the disclosure. Therefore, it should be construed that not only the embodiments disclosed herein but also all modifications or modified forms capable of being derived on the basis of the technical idea of the disclosure are included in the scope of the disclosure.

What is claimed is:

1. An electronic device comprising:
a communication module;
a memory; and
a processor operatively connected to one of the communication module and the memory, wherein the processor is configured to:
establish a first network connection with an external device via the communication module through a first network,
while the electronic device is connected to the external device, broadcast device information associated with the external device through a second network,
transmit connection information associated with the external device to an external electronic device transmitting a request to establish a second network connection with the external device through the second network,
change a configuration value of a disconnection notification timer to reduce the time required to perform an expedited release of the first network connection between the electronic device and the external device,
configure the changed disconnection notification timer with the external device,
release the first network connection with the external device based on the changed configuration value, without processing a reconnection message received from the external device.

2. The electronic device of claim 1, wherein the first network is a Bluetooth network, and the second network is a network other than a Bluetooth network.

3. The electronic device of claim 1, wherein the processor of the electronic device is configured to transmit the connection information associated with the external device to the external electronic device through a secure channel in the second network.

4. The electronic device of claim 1, wherein the processor of the electronic device is further configured to:
make a request for changing a role with the external device, and
change the disconnection notification timer upon receiving an acceptance of the role change request from the external device.

5. The electronic device of claim 1, wherein the processor of the electronic device is configured to change a Bluetooth controller to not process the reconnection message received from the external device using a vendor-specific command after the first network connection with the external device is released.

6. The electronic device of claim 5, wherein the processor of the electronic device is configured to receive the reconnection message from the external device and transmit a notification of completion of the release of the connection with the external device to the external electronic device without processing the reconnection message received from the external device.

7. The electronic device of claim 1, wherein the connection information associated with the external device comprises Bluetooth address information of the electronic device and a link key.

8. The electronic device of claim 1, wherein the processor of the electronic device is further configured to display at the electronic device the external electronic device transmitting a request for the connection information associated with the external device, based on contacts stored in the memory of the electronic device.

9. The electronic device of claim 1, wherein, when a notification directed to a right to use the first external device is returned from the second external electronic device, the processor of the electronic device is configured to change a Bluetooth controller to process a message received from the first external device through a vendor-specific command.

* * * * *